US012481955B2

(12) United States Patent
Baird et al.

(10) Patent No.: US 12,481,955 B2
(45) Date of Patent: Nov. 25, 2025

(54) INTELLIGENT INVENTORY TRACKING ACROSS SUPPLY-CHAIN NETWORKS

(71) Applicant: TrackFly, Inc., Sandy, UT (US)

(72) Inventors: Stephen Parker Baird, Sandy, UT (US); Clayton James Perkins, Riverton, UT (US); Matthew Robert Newman, South Jordan, UT (US); Daniel Larry Duncan, American Fork, UT (US)

(73) Assignee: TRACKFLY, INC., Sandy, UT (US)

( * ) Notice: Subject to any disclaimer, the term of this patent is extended or adjusted under 35 U.S.C. 154(b) by 290 days.

(21) Appl. No.: 18/148,999

(22) Filed: Dec. 30, 2022

(65) Prior Publication Data

US 2023/0214771 A1 Jul. 6, 2023

Related U.S. Application Data

(60) Provisional application No. 63/266,246, filed on Dec. 30, 2021.

(51) Int. Cl.
*G06Q 10/087* (2023.01)
(52) U.S. Cl.
CPC ................... *G06Q 10/087* (2013.01)
(58) Field of Classification Search
CPC .................................................... G06Q 10/087
USPC ......................................................... 705/28
See application file for complete search history.

(56) References Cited

U.S. PATENT DOCUMENTS

| | | | |
|---|---|---|---|
| 7,130,807 B1 * | 10/2006 | Mikurak .......... | G06Q 10/06375 705/7.31 |
| 10,664,801 B1 * | 5/2020 | Rosenfeld .......... | G06Q 10/0875 |
| 10,922,646 B1 * | 2/2021 | Humair .............. | G06Q 10/087 |
| 2005/0235274 A1 * | 10/2005 | Mamou .............. | G06F 16/254 717/136 |
| 2020/0320470 A1 * | 10/2020 | Whitney ............. | G06F 9/547 |

FOREIGN PATENT DOCUMENTS

CN 115053240 A * 9/2022 ............. G06Q 10/00

* cited by examiner

*Primary Examiner* — Russell S Glass
(74) *Attorney, Agent, or Firm* — VLP Law Group, LLP; Michel Bohn

(57) ABSTRACT

An intelligent supply-chain wide tracking and analysis system is described. In some instances, the system may receive variant data describing a variant of a product from a first client system, generate a variant profile based on the variant data, and determine a connection definition specific to the variant profile and defining a connection between the first client system and a second system. The system may provide access to a first data field containing data in the client profile from the first client system to the second client system based on the connection definition. The system may also receive an inventory value for the variant from the second client system and, using the variant profile and connection definition, provide access to the inventory value to the first client system.

20 Claims, 13 Drawing Sheets

Fields

| No. | Label | Type | Name | | Options | |
|---|---|---|---|---|---|---|
| 1 | Company ID | Link | company_id | ● | Company | ✎ Edit |
| 2 | Product ID | Link | product_id | ● | Product | ✎ Edit |
| 3 | | Column Break | cb_3 | ○ | | ✎ Edit |
| 4 | Company Name | Read Only | company_name | ○ | | ✎ Edit |
| 5 | Product Name | Read Only | product_name | ○ | | ✎ Edit |
| 6 | Brand Name | Read Only | brand_name | ○ | | ✎ Edit |
| 7 | | Section Break | sb_3 | ○ | | ✎ Edit |
| 8 | Variant Name | Data | variant_name | ● | | ✎ Edit |
| 9 | Status | Select | status | ● | Active | ✎ Edit |
| 10 | Primary Image | Attach Image | primary_image | ○ | | ✎ Edit |
| 11 | | Section Break | sb_2 | ○ | | ✎ Edit |
| 12 | Variant Properties | Table | variant_properties | ○ | Variant Properties | ✎ Edit |
| 13 | | Section Break | sb_3 | ○ | | ✎ Edit |
| 14 | Identifiers | Heading | identifiers_heading | ○ | | ✎ Edit |
| 15 | MPN | Data | mpn | ○ | | ✎ Edit |
| 16 | SKU | Data | sku | ○ | | ✎ Edit |

INTELLIGENT INVENTORY TRACKING ACROSS SUPPLY-CHAIN NETWORKS

BACKGROUND

The present disclosure relates to a system for tracking inventory across nodes in a supply chain. Implementations of the disclosure describe data structures and features that facilitate inter-device communication thereby facilitating certain types of data access based on nodes.

Entities, such as businesses, brands, suppliers, distributors, etc., struggle to track data, such as inventory volume, especially where information is spread across disparate systems and entities. For example, a brand may use several distributors who, in turn, supply inventory to several retailers, although there may be more or fewer entities in the supply chain. Inventory and associated data can be spread across some or all of the facilities and computing systems of these entities, which may use various, unrelated computing systems. Accordingly, it is very difficult for a brand or other entity to determine where (e.g., which retailer, distributor, or location) inventory is or is not selling, where and how much stock is available, and other information, thereby making it difficult to predict need and production levels, among other issues. Tracking inventory across disparate systems is typically not automatic and consumes substantial employee time and computer resources.

For example, current systems in which data is stored separately, separately entered, and manually transferred consume substantial computing resources, bandwidth, and computer storage. Furthermore, because these systems are disconnected, not only do computing devices lack up-to-date and accurate information, but they are also slower and introduce both computational inefficiency and inventory inefficiency.

With existing solutions, brands or other entities in a supply chain are forced to be reactive instead of proactive because they have little to no visibility regarding the state of their inventory across their network. They may receive some piecemeal information from some distributors and retailers, but it is often out-of-date, incomplete, or inaccurate, and/or difficult to use reliably as a result. As such, brands/suppliers are often left to operate in a vacuum. Further, while e-commerce platform like Shopify® give brands the ability to sell product and manage their own inventory, such platforms generally fail to provide any network visibility.

Supply and demand may not be aligned, which causes warehouses and stores to see record levels of out-of-stock and overstocked items. Information exchange only occurs sporadically or not at all. Current systems utilize internal metrics to monitor inventory and manage forecasting rather than real data, for example, collected throughout multiple entities and layers of entities, such as brands, manufactures, distributors, and retailers. Accordingly, existing solutions provide poor consumer experience, missed sales opportunities, and inventory spoilage, while also being computationally inefficient and inaccurate.

Furthermore, because systems are disconnected and each entity in a node generates their own catalogs of products they carry, information about items in catalogs is often incorrect, incomplete, or out of date.

SUMMARY

An automated tracking and analysis system can be configured to perform particular operations or actions by virtue of having software, firmware, hardware, or a combination of them installed on the system that in operation causes or cause the system to perform the actions. One general aspect of the system includes a method comprising determining a first connection between a first client system and a second client system for a variant profile, the variant profile describing a variant of a physical item; receiving a first inventory value associated with the variant profile from the second client system; and providing access to the first inventory value to the first client system based on the first connection associated with the variant profile.

Implementations of the system may include one or more of the following features, such as receiving an attribute for a first data field of the variant profile from the first client system, the attribute describing the variant; providing access to the first data field and the attribute to the second client system based on the first connection; determining a second connection between the second client system and a third client system; providing access to the first data field and the attribute by the third client system based on the second connection; receiving a second inventory value from the third client system; and providing access to the second inventory value by the first client system based on the first connection According to another innovative aspect, the system may perform operations comprising receiving from a first client system, variant data describing a variant, the variant including a physical item, and the variant data describing one or more attributes of the physical item; generating a variant profile based on the variant data, the variant profile including one or more data fields, and a first data field of the one or more data fields describing an attribute of the variant; determining one or more first connection definitions defining one or more first connections between the first client system and a second client system, the one or more first connections being associated with the variant profile; providing access to the first data field to the second client system based on the one or more first connection definitions; receiving a first inventory value associated with the variant profile from the second client system; and providing access to the first inventory value to the first client system based on the one or more first connection definitions associated with the variant profile.

Implementations of the operations may include one or more of the following features. The operations may further include determining, by the one or more processors, one or more second connection definitions defining one or more second connections between the second client system and a third client system, the one or more second connections being associated with the variant profile; providing access to the first data field of the variant profile to the third client system based on the one or more second connection definitions; receiving a second inventory value associated with the variant profile from the third client system; providing access to the second inventory value to the first client system based on the one or more first connection definitions and the one or more second connection definitions associated with the variant profile; that the first client system is associated with a brand, the second client system is associated with a distributor, and the third client system is associated with a retailer, the second client system and the third client system each including an inventory management system; receiving a plurality of inventory values for a plurality of different variant profiles corresponding to a plurality of different variants, the plurality of different variant profiles including the first data field and the attribute described by the first data field; and generating an analytic describing the attribute for the plurality of different variant profiles using the first inventory value and the plurality of inventory values.

Implementations of the system may include one or more of the following features, such as that the one or more first connection definitions define an association between the first client system and the second client system that causes the first data field to be transmitted to the second client system; that the one or more first connection definitions describe data-field specific access for the variant profile based on identity of a receiving client system, the receiving client system including the first client system, the data-field specific access controlling access to the first inventory value by the first client system; and transmitting the first inventory value to the first client system based on the data-field specific access defined by the one or more first connection definitions.

Implementations of the operations may include one or more of the following features, such as receiving a set of inventory values from a set of client systems, the set of inventory values identifying inventory for the variant at a set of physical locations; determining a total inventory level based on the set of inventory values and the first inventory value; associating data describing the first inventory value with the first inventory value, the data indicating an identity of the second client system from which the first inventory value was received; and determining a region-specific inventory level for a geographic region based on the set of inventory values, the first inventory value, and the data describing the first inventory value.

Implementations of the operations may include one or more of the following features, such as determining a second connection definition defining a second connection between the first client system and the second client system, the second connection being associated with a second variant profile for a second variant; receiving a second inventory value associated with the second variant profile from the second client system; providing access to the second inventory value to the first client system using the second connection; determining, by the one or more processors, a third connection definition defining a third connection between the first client system and a third client system, the third connection being associated with the variant profile of the variant; receiving a third inventory value associated with the variant profile from the third client system; and providing access to the third inventory value to the first client system using the second connection.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example and not by way of limitation in the figures of the accompanying drawings in which like reference numerals are used to refer to similar elements.

FIGS. 7C and 7D are example graphical interfaces for receiving and organizing variant data describing a variant.

DETAILED DESCRIPTION

Figure 1:
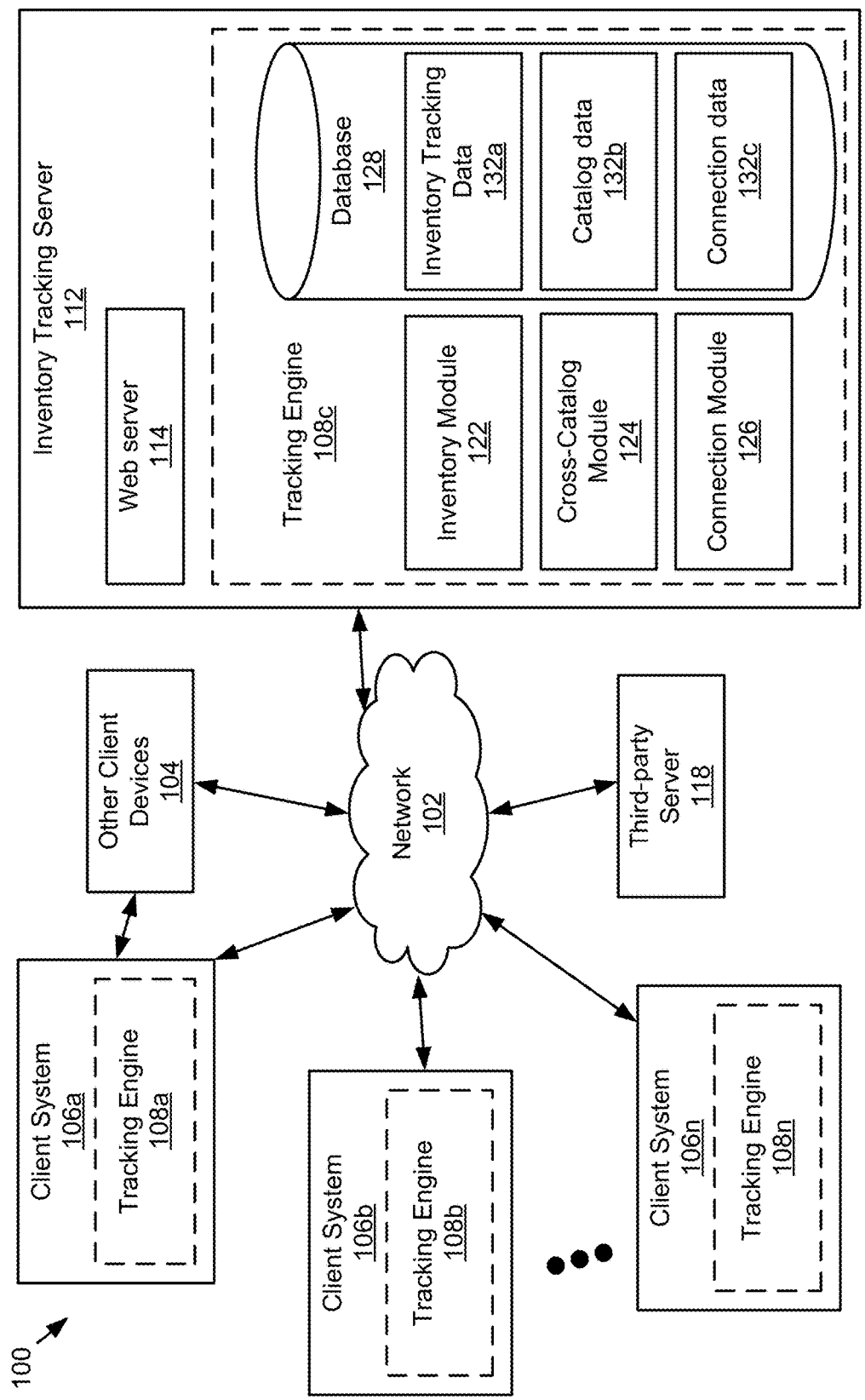
FIG. 1 is a block diagram of an example system for providing an automated tracking and analysis tool.

The present disclosure relates to technology for intelligent, adaptable, and accurate inventory tracking across multiple levels of a supply chain network of systems. The technology allows product information to flow downstream across disparate nodes or computing systems in a supply chain, even when different nodes (e.g., entities, brands, distributors, retailers, etc.) have differing catalogs. The technology, in turn, automatically tracks inventory and various other data of specific products or variants thereof across supply chains and networks and provides accurate, up-to-date inventory information to defined entities, such as brands. The technology may conform some or all of the information for a profile/file of a specific variant of an item among various entities, while also transmitting or otherwise providing access to varying levels of inventory or other data to various entities even across multiple levels of separation in the chain or network.

The technology allows an entity, such as a distributor or seller, to look upstream to brand or manufacturer inventory systems to identify variants and downstream to retailer systems to determine where inventory is as well as interchange other information with the other entities. The technology may maintain connection information across entities thereby controlling interaction between the systems for tracking inventory and providing catalog data, among other data. For example, typically a computing system of a brand does not have access to the amount of inventory held by a certain retailer because they have a separate computing system and unrelated inventory tracking software. The technology may provide various application programming interfaces, protocols, and/or systems for providing specified and transparent communication or other interaction between inventory systems and devices. For instance, the technology may control visibility and propagation of certain information across computing systems (e.g., servers or client systems 106) of various entities in a supply chain using defined connections (e.g., a relationship between two different companies that share a catalog and/or one or more products or variants). In some implementations, while the technology may be used with separate systems, in other implementations, the technology may be hosted on a server with cloud access by disparate devices, thereby allowing the disparate devices to access and/or provide data according to the features and operations described herein.

Implementations of the technology provide a platform (e.g., implemented or provided by the inventory tracking server 112) that addresses the deficiencies of prior solutions by giving brands visibility into and control over their retailer/distributor network. For instance, via the platform, a computing system of a supplier can determine where inventory is within a network of devices or inventory systems regardless of the number of nodes in the network. The supplier's computing system can also feed product data into the platform, thereby giving the supplier's computing system control over the product specifications, description, and media assets (e.g., photos, videos, etc.), for example, at the inventory systems of downstream entities, although implementations of the technology may also allow the downstream entities to modify data within their own system without impacting certain data for upstream systems, as described below. Users using inventory computing systems of suppliers, distributors, or retailers may also use the technology to input and/or view inventory data, source nearby stock, access up-to-date products information, and/place orders for available products, which helps to synchronize information among the different nodes of the network with respect to inventory and product availability, thereby improving computational efficiency and data access, as well as improving inventory levels across the supply chain/network. Other benefits and advantages are also possible and contemplated.

By way of further example, historically a salesperson for a large shoe brand would have to physically travel to the physical retail locations to count the boxes of shoes on the shelves in those locations, take notes, and attempt to determine orders based on that information. Later, employees of retailers would call or manually transmit inventory information to another user at a brand, who would reconcile item types and variants and/or enter inventory information. This caused significant delay, unreliability, and inefficiencies in both physical and computer processes, as described elsewhere herein. Advantageously, the platform eliminates much of this work by allowing computing devices and their users to immediately be informed on what products can be supplied, the inventory on hand, and various other data and analytics for various devices and locations without having to physically go to those locations.

These and other features are described in further detail in reference to the figures below. The features and advantages described herein are not all-inclusive and many additional features and advantages are within the scope of the present disclosure. Moreover, it should be noted that the language used in the present disclosure has been principally selected for readability and instructional purposes, and not to limit the scope of the subject matter disclosed herein.

With reference to the figures, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 is a block diagram of an example system 100 for providing an intelligent inventory tracking tool. The illustrated system 100 may include client systems 106a . . . 106n, which may run instances of, components of, or otherwise access the tracking engine 108a, 108b, 108c . . . 108n, a third-party server 118, and an inventory tracking server 112, which are electronically communicatively coupled via a network 102 for interaction with one another, although other system configurations are possible including other devices, systems, and networks. For example, the system 100 could include any number of client systems 106, third-party servers 118, application servers 112, and other systems and devices.

The network 102 may include any number of networks and/or network types. For example, the network 102 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The client system(s) 106a, 106b, and 106n may include one or more computing devices having data processing and communication capabilities. The client system 106 may couple to and communicate with other client systems 106 and the other entities of the system 100 via the network 102 using a wireless and/or wired connection. For instance, client systems 106 may communicate directly with one another (e.g., using the network 102) or via the inventory tracking server 112, for example using the tracking engine 108 or instances, components, interfaces, or protocols thereof. Examples of client systems 106 may include, but are not limited to, point-of-sale devices, tablets, laptops, desktops, netbooks, server appliances, servers, virtual machines, etc. The system 100 may include any number of client systems 106, including client systems 106 of the same or different type. In some instances, the system 100 may include other client devices 104, which may be point-of-sale devices, scanners, mobile computing devices, or other devices that interact with a client system 104 and/or inventory tracking server 112.

Although other implementations are possible and contemplated herein, a client system 106 may include, be part of, or may interface or otherwise communicate with various other systems, such as inventory management systems e-Commerce platforms, enterprise resource planning systems, product information management systems, or other systems, which may be hardware- or software-based systems. For instance, while not illustrated in FIG. 1, a client system 106 may run or access both an inventory management system and a tracking engine 108. For example, an inventory management system may communicate with the tracking engine 108 via an API or another interface, as described elsewhere herein. Depending on the implementation, an inventory management system of an intermediary distributor may receive data from the tracking engine 108, which, in turn, receives the data from an inventory management system of a retail store.

A plurality of client systems 106a . . . 106n are depicted in FIG. 1 to indicate that the inventory tracking server 112 and its components may aggregate information about and provide data associated with the systems and processes described herein to a multiplicity of client systems 106a . . . 106n for a multiplicity of entities. In some implementations, a single user or entity may use more than one client system 106, which the inventory tracking server 112 may use to track and aggregate interaction data associated with the entity through a variety of different channels including online, physical, and phone (e.g., text, voice, etc.) channels, as discussed elsewhere herein. In some implementations, the inventory tracking server 112 may communicate with and provide information to a client system 106.

Furthermore, each client system 106 may be associated with a separate entity or node in a supply chain or network associated with the platform provided by the tracking engine 108. Each illustrated client system 106 may represent one or multiple devices, systems, servers, etc.

The inventory tracking server 112 may include a web server 114, a tracking engine 108, and a database 128. In some configurations, the tracking engine 108b may be distributed over the network 102 on disparate devices in disparate locations or may be executed at a single location, in which case the client system 106a and/or the inventory tracking server 112 may each include an instance of the tracking engine 108 and/or portions thereof or may otherwise communicate with the tracking engine 108. For example, the tracking engine 108 may be implemented as a cloud service or a remote service provided by a separate client system 106 or server. The client systems 106 may also store and/or operate other software such as a tracking engine 108, an operating system, other applications, etc., that are configured to interact with the inventory tracking server 112 via the network 102.

The inventory tracking server 112 and the third-party server 118 have data processing, storing, and communication capabilities, as discussed elsewhere herein. For example, the servers 112 and/or 118 may include one or more hardware servers, server arrays, storage devices and/or systems, etc. In some implementations, the servers 112 and/or 118 may include one or more virtual servers, which operate in a host server environment.

The tracking engine 108 may include computer logic executable by the processor 204 on a client system 106 and/or inventory tracking server 112 to provide for user interaction, receive user input, present information to the user via a display, and send data to and receive data from the other entities of the system 100 via the network 102. For example, a user and client system 106 may use the tracking engine 108 to perform the operations described herein. The technology described herein may be provided by or enabled by the tracking engine 108, which may address problems with existing inventory tracking, such as that described in the Background.

The technology and tracking engine 108 may use a network map and/or another data architecture to facilitate the functionality of the platform and interactability described herein. For instance, the tracking engine 108 may store a file(s) representing a network map that indicates relationships between different nodes in the network (e.g., connections between suppliers, distributors, retailers, etc.), as well as defining a level or type of data access to which each node is entitled, although other implementations are possible. Additions to the network map may be made via APIs and authorized by suppliers or their authorized users. The system is described in additional detail in reference to the other figures described herein.

Accordingly, the tracking engine 108 connects client systems 106 of suppliers with client systems 106 of downstream retailer and provides improved product networking for unbiased visibility into inventory levels, locations, flow rates, and other data and analytics (e.g., as described in further detail below). Accordingly, using the platform and the increased data visibility provided thereby, not only can variant data be ensured to be accurate and automatically updated throughout nodes by the tracking engine 108, but suppliers, distributors, retailers, and other stakeholders in supply chains/networks can make intelligent, fast, and accurate decisions using the improved information. In some instances, the tracking engine 108 may facilitate business-to-business order processing including facilitating auto-replenishment orders based on accurate inventory threshold triggers, for example by transmitting a signal to another node in the supply chain responsive to a trigger. The tracking engine 108 may also cultivate more meaningful data exchange from brands to retailers to increase search engine optimization and collaborative fulfillment. In some implementations, the tracking engine 108 may provide marketplace integrations including plugging inventory graphs into marketplace channels, thereby promoting rapid order fulfillment from local sources.

In some implementations, the tracking engine 108 provides a unified, potentially single platform that connects various devices in a supply chain in a scalable manner, for example, using one-to-many connections with real-time catalog and inventory updates. Depending on the implementation, the tracking engine 108 may additionally or alternatively provide many-to-many connections, for example, in web of nodes that are interconnected in one, two, or other steps to other nodes in the network. For example, as described in further detail elsewhere herein, the tracking engine 108 may allow information to flow to and/or through nodes at one or to transmit data to/from various systems. Although implementations of the technology described herein use the inventory tracking server 112 as an intermediary node, nodes may be directly or indirectly connected through the network 102, another client system 106, a third-party server 118, or otherwise.

The tracking engine 108 may provide various features and operations at various levels of the supply chain. For instance, the tracking engine 108 may provide a supplier management system in which a single interface may be used to connect with and manage each supplier's products. The tracking engine 108 may provide inventory tracking at various supply chain levels and devices, which increases confidence that the system inventory levels match actual physical inventory level for improved fulfillment. The tracking engine 108 may connect a tracking system directly with existing inventory or point-of-sale systems in an integrated and seamless way that is automatically and/or easily synced across systems, for example, using the features described below.

In some implementations, the tracking engine 108 may utilize a brand's digital assets across the supply chain to publish webpages including variant data online, such as the variant data and/or inventory data provided herein, which published webpages may automatically update data across listings of variants, which ensures accuracy and allows the brand to control the narrative and information about a product/variant even where the webpage is published by a downstream node (e.g., by a retailer). The information may be integrated into the displays, interfaces, and systems of various points in the supply chain, such as that of a retailer or across many retailers.

Some implementations of the tracking engine 108 facilitate data exchange among systems, as described herein, in order to provide automated uploading of catalog(s) of variant data (e.g., including details of products and their variants) for use by other systems or in tracking. The data exchange provides connection and data control between disparate systems or files, inventory visibility (e.g., providing various levels of detail and types of data in various different systems/to different entities), among other improvements. Furthermore, as described in further detail below, the tracking engine 108 may allow a certain entity (e.g., a brand) to establish and distribute various data for a product (e.g., master or default data describing a variant) across disparate computing systems (e.g., of the brand's distributors, retailers, etc.), thereby allowing the brand to maintain brand integrity, ensure inventory is being accurately tracked for variants, and performing other operations described herein.

In some implementations, the technology allows managed integrations where the tracking engine 108, it's modules, and/or features are integrated with mainstream platforms at point-of-sale devices (e.g., to provide data to the POS or receive data, such as inventory or sales data, therefrom), enterprise resource planning systems, inventory management systems, order management systems, and other systems. The operations described herein may additionally or alternatively provide processing, rapid creation, dashboards or interfaces, and status communication of orders, shipments, and invoices, for example, to receive and provide information to retailers, customers, distributors, or even manufacturers for use in replenishing inventory.

In some implementations, the tracking engine 108 may track and provide analytics for the supply chain/network in its entirety or specific to one or more nodes, etc., for example, the tracking engine 108 may perform statistical analysis across the system to generate retailer scorecards, product/variant performance, or other analytics. For example, the tracking engine 108 may identify accumulations of inventory at certain points in a supply chain, identify high/low flow areas of inventory, determine physical locations where a certain product/variant/type of product is or is not selling (e.g., even across multiple distributors or unrelated retailers or branches of the supply network), or identify other points for analytics. Depending on the implementation, machine learning techniques or other statistical analysis may be used to identify problem points in the supply network. Accordingly, for instance, a tracking engine 108 (e.g., an instance thereof or access thereto by a brand) may identify certain retailers or geographic locations that have abnormal levels of inventory, inventory turnover, or other attributes.

In some implementations, the tracking engine 108 may include various modules, such as an inventory module 122, a cross-catalog module 124, and a connection module 126, although these are provided as examples and many other configurations are possible.

The inventory module 122 may identify inventory levels, aggregate them, and provide them to various entities/nodes in a supply chain or network, for example, by using connections and products/variants to track, aggregate, and provide information specifying inventory levels, locations, analytics, and so forth with certain nodes or client systems 106. The inventory module 122 may aggregate inventory levels and details into the database, for example, into inventory tracking data 132a, as described in further detail elsewhere herein.

The cross-catalog module 124 may receive catalog data identifying variants, such as brands, products, variants (e.g., a certain size, color, or configuration of a product), etc. The catalog data may represent sets of items available from a certain entity (e.g., brand, distributor, retailer, etc., associated with a node or client system 106). The tracking engine 108 may store, access, or otherwise provide for separate or unified catalogs for various entities while maintaining data conformity (e.g., downstream) and facilitating inventory tracking (e.g., upstream) for individual variants in the catalog(s).

The cross-catalog module 124 may identify and/or store a data file (e.g., in a list, graph, or table) identifying catalog contents, variant attributes, links between variants, brands, catalogs, etc., for example, in the catalog data 132b. In some implementations, the cross-catalog module 124 may identify the same product/variant in different catalogs, client systems 106, inventory systems, documents, etc. It may link the same variant together across catalogs in the catalog data 132b, so that inventory may be aggregated and/or flow over the same variant. For instance, a supplier may have a first data file or profile (e.g., stored in their own system or the catalog data 132b) identifying a first variant and its features (e.g., with a certain ID, color, brand, etc.) while a retailer may have a second data file or profile (e.g., stored in their own system or the catalog data 132b) identifying a second variant and its features. The cross-catalog module 124 may determine whether the two documents/variants actually represent the same variant, for example, by matching vectorized features, Levenshtein distance matching, or other methods. Where one document is more complete, the entities use different identification codes, or there is an error in the data, the tracking engine 108 may use the more complete data file, may defer to a higher node in a supply chain (e.g., to information provided by a brand), or otherwise determine which data to maintain across systems. In some instances, the tracking engine 108 may request verification of data by a stakeholder. In some implementations, the tracking engine 108 may allow each entity, node, or client system 106 to use, add, or view different data in their own system while tracking and/or otherwise using the corrected or consistent data for the variant across nodes/catalogs/client systems 106, etc.

In some implementations, a higher/upstream entity in a supply chain may provide variant and/or catalog data into the tracking engine 108, which may propagate the data to the variant profiles/data files, catalog files, and/or systems of all other entities in the supply chain, so that downstream entities have reliable information without necessarily having to enter it into their own files. In some implementations, a client system 106 may access the variant or other data on the database 128 on an inventory tracking server 112 either continuously or by periodically retrieving the data therefrom. A stakeholder may manually enter data describing a variant into the tracking engine 108 or may upload the data, for example, as a batch (e.g., as a table, list, or other structured data file). In some instances, each node in a supply chain or network may create its own catalog file identifying a set(s) of variants and their attributes, for example, using variant documents/information provided by a brand with which the node and/or variant is associated.

For example, brands may input/upload sets of files (which may be the brands' catalogs) describing associated variants (e.g., owned by the brand). A distributor connected to the brand (e.g., using a connection described elsewhere herein) may use the sets of files for the variants to build their own second, aggregated catalog of variants, which identifies the variants (even from multiple different brands) available from that distributor using the tracking engine 108. The tracking engine 108 may provide and/or automatically update files or systems for other nodes, such as a catalog file of a distributor that is downstream in a supply chain (e.g., as defined by a network graph or map in the connection data 132c) from the brand, using the original information from the brand. In some implementations, the distributor may add additional information to its catalog file or variant profile describing a variant without affecting a connection of the variant to other nodes or the data entered by a brand (or another entity/node, such as a distributor, retailer, or otherwise) and propagated downstream. A user and or client system 106 may define which data or attributes describing a variant or catalog should remain associated with a certain node/entity and which data should be propagated to other nodes (e.g., downstream, upstream, etc., as described below). For example, if a distributor uses a different filing or identification system (e.g., different SKUs, UPCs, or IDs than other entities, nodes, client systems 106, brands, etc.), the catalog data 132b may store or provide the information only for the distributor in the distributor's client system 106 and/or instance of the tracking engine 108.

In some implementations, a retailer's client system 106/tracking engine 108 instance may be connected to a client system 106/tracking engine 108 instance of a distributor or brand, whether directly or indirectly, and may download or otherwise access the variant file(s) to build their own catalogs in the same way. In the same way, the data may be shared or used across nodes in a supply chain/network, whether upstream, downstream, or otherwise. For example, a retailer's client system 106 or a user thereof may load (e.g., through a mapping/merge process) product/variant and inventory data to the tracking engine 108, for instance, via a point-of-sale system (e.g., Shopify®, Lightspeed®, etc.) or manually.

In some implementations, the inventory module 122 may identify the common variant among nodes in the system and use associated data from each node to identify and track inventory across nodes (e.g., distributors, nodes, etc.) based on the connection data 132c. For example, when connections are defined for a set of nodes (e.g., a brand connects to a distributor, which connects to a retailer via the tracking engine 108), the tracking engine 108 may transmit or otherwise move data based on the connections, which may be directional based on specific data fields, as described elsewhere herein. For example, using the connections, a variant profile/file may include certain data fields that are shared downstream (e.g., SKU, image(s), description, color, sizing, MSRP, etc.) by the tracking engine 108, certain data fields that are shared upstream (e.g., inventory levels, inventory sell through rate, requested re-orders, etc.), certain data fields that are not shared to other entities/nodes (e.g., internal identification number, sell through rate, pricing, internal notes, etc.), or other shared data that may be shared with other entities nodes, such as indirectly related retailers or distributors (e.g., data, such as inventory level in a certain geographic area, requests for inventory from other entities outside of a typical supply chain, etc.).

As described in further detail below, the data in the data fields may be transmitted between client systems 106 by the tracking engine 108 or the data may be stored in a central database (e.g., at the inventory tracking server 112) that is accessible to separate entities and/or client systems 106. For instance, the data fields may be synchronized or otherwise accessed on the inventory tracking server 112 and the access may be managed based on the data fields and data flow defined by the connections, as described below. In implementations where the tracking engine 108 transmits data directly between client systems 106, the data may be encoded thereby limiting access only to client systems 106 with designated access or connections for the data (e.g., as controlled by tokens or private keys, etc.). Accordingly, where nodes are connected in a mesh network, data-field specific access is limited to defined connected client systems 106/tracking engine 108 instances/entities.

In some implementations, as described elsewhere herein, the inventory tracking server 112 may access some or all of the data fields for each variant profile, such as the inventory across all nodes in a supply chain or network. The tracking engine 108 may use the data, such as inventory, inventory change rate, etc., to generate analytics using statistical analysis across the network. For example, the tracking engine 108 may determine which variants have the highest change rates or lowest inventory in certain geographic areas, nodes that consistently have low or high inventory, or other analytics, as described below.

The tracking engine 108 may provide various data and levels of detail to different entities. For example, the tracking engine 108 may use a location attribute associated in the connection data 132c with a set of retailers connect to the brand (e.g., via one or more distributor or other supply chain client systems 106) to identify inventory levels (and/or other details, such as sales rate) geographic regions where inventory exists for that brand's variants. Similarly, a client system 106 of a brand may have access to a retailer's data without accessing details of other nodes in a supply chain (e.g., the tracking engine 108 may identify the inventory at a retailer to a brand without identifying which distributor the retailer is using/connected to). The exchange of inventory and other data may occur between any interconnected entity and using various levels of detail (e.g., to provide data security, privacy, etc., between entities).

The connection module 126 may identify, maintain, establish, etc., connections between entities, variants, nodes, etc., which connections may be specific to data fields for a variant. For example, the connection module 126 may receive a request to connect from a certain brand to a certain distributor. The connection module 126 may receive an acceptance from the distributor and automatically establish a connection between the certain distributor and the certain brand, for example, stored in the connection data 132c. The connection may be per variant, per product, per brand, per data field, or across an entire catalog of each entity. For example, only those variants or brands associated with the certain brand may be connected between the distributor and the brand. As such, while the distributor may carry multiple brands, only those connected (e.g., variant by variant, brand by brand, etc.) to the certain brand are connected for data exchange with the client system 106 of that brand, as described in further detail below. Similar connections may be formed at other levels of a supply chain/network. Accordingly, the tracking engine 108 may vary data visibility and access across variants in a node's catalog based on the connections to cause the data to flow for specific variants and/or data fields to defined connected nodes.

For example, when a retailer uses the tracking engine 108 to establish a connection with a distributor, the data may flow between the certain brand and/or retailer whether directly or via the certain distributor forming a mutual connection. These and other features are described in further detail below.

In some implementations, the inventory tracking server 112 may communicate with a client system 106 in order to perform the functionality described herein. The inventory tracking server 112 may receive information and provide information to the tracking engine 108 to generate the interfaces described herein, as well as perform and provide analytics and other operations. In some implementations, the inventory tracking server 112 and/or tracking engine 108 may perform additional operations and communications based on the information received from client systems 106, as described elsewhere herein.

The database 128 may be stored on one or more information sources for storing and providing access to data, such as the data storage device 208. The database 128 may also store data describing client systems 106, instances of the tracking engine 108, users, user roles, entity identifiers, analytics, geographical area definitions, or other data.

A third-party server 118 can host services such as a third-party application (not shown), which may be individual and/or incorporated into the services provided by the inventory tracking server 112. For example, the third-party server 118 may represent one or more item databases, forums, company websites, etc., from which data, such as variant attributes, analytics data, etc., are retrieved or transmitted.

It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
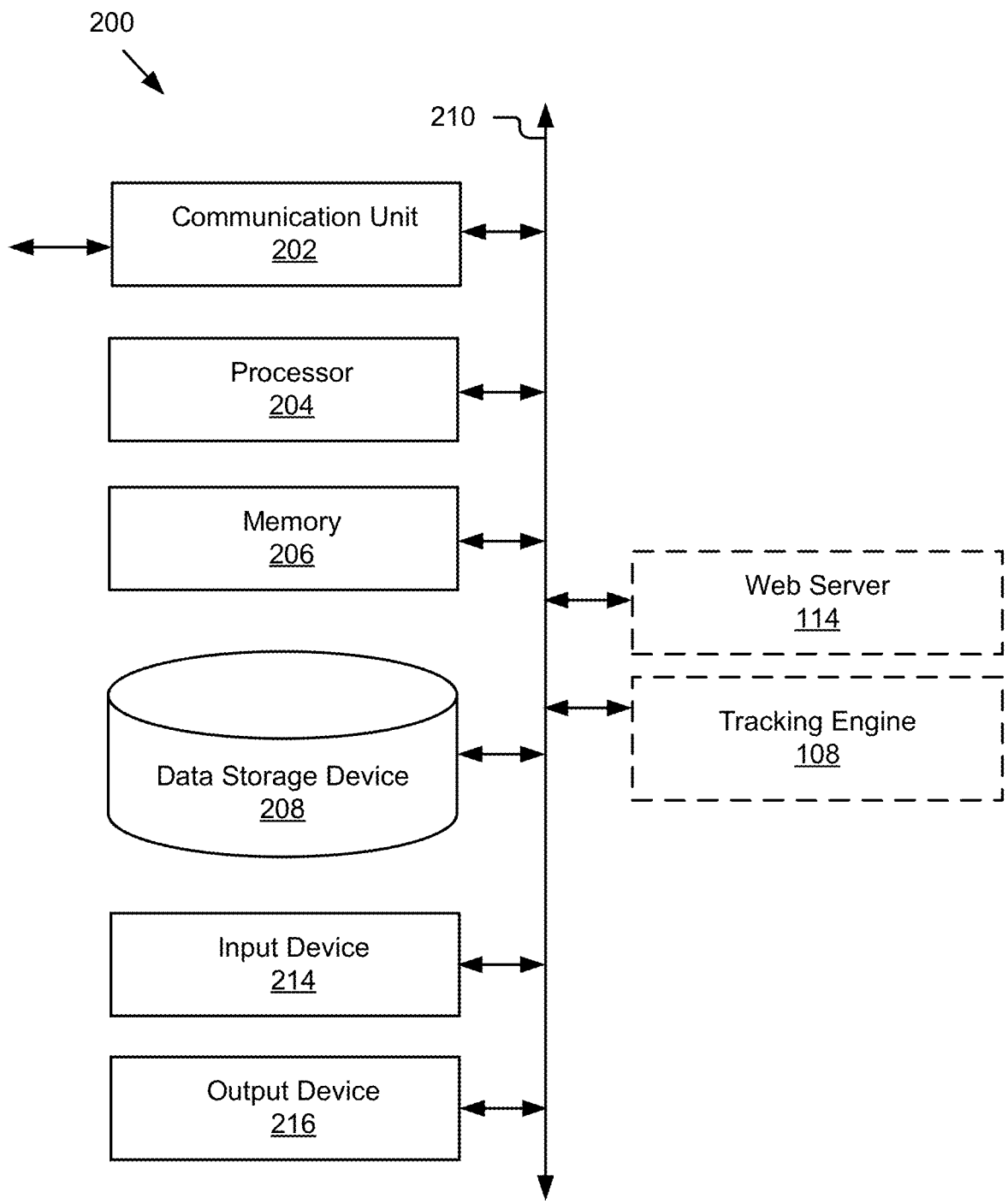
FIG. 2 is a block diagram of an example computing system.

FIG. 2 is a block diagram of an example computing system 200, which may represent the computer architecture of a client system 106, third-party server 118, inventory tracking server 112, and/or another device described herein, depending on the implementation. In some implementations, as depicted in FIG. 2, the computing system 200 may include a web server 114, a tracking engine 108, or another application, depending on the configuration. For instance, a client system 106 may include a tracking engine 108; and the inventory tracking server 112 may include the web server 114, the tracking engine 108, and/or components thereof, although other configurations are also possible and contemplated.

The tracking engine 108 includes computer logic executable by the processor 204 to perform operations discussed elsewhere herein. The tracking engine 108 may be coupled to the data storage device 208 to store, retrieve, and/or manipulate data stored therein and may be coupled to the web server 114, and/or other components of the system 100 to exchange information therewith.

The web server 114 includes computer logic executable by the processor 204 to process content requests (e.g., to or from a client system 106). The web server 114 may include an HTTP server, a REST (representational state transfer) service, or other suitable server type. The web server 114 may receive content requests (e.g., product search requests, HTTP requests) from client systems 106, cooperate with the tracking engine 108 to determine the content, retrieve and incorporate data from the data storage device 208, format the content, and provide the content to the client systems 106.

In some instances, the web server 114 may format the content using a web language and provide the content to a corresponding tracking engine 108 for processing and/or rendering to the user for display. The web server 114 may be coupled to the data storage device 208 to store retrieve, and/or manipulate data stored therein and may be coupled to the tracking engine 108 to facilitate its operations. In some implementations, the web server 114 may provide a web interface for interacting with a cloud-based tracking engine 108 (e.g., on the inventory tracking server 112) or for running some or all of the code for an instance of the tracking engine 108.

As depicted, the computing system 200 may include a processor 204, a memory 206, a communication unit 202, an output device 216, an input device 214, and a data storage device 208, which may be communicatively coupled by a communication bus 210. The computing system 200 depicted in FIG. 2 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 200 may include various operating systems, sensors, additional processors, and other physical configurations. The processor 204, memory 206, communication unit 202, etc., are representative of one or more of these components.

The processor 204 may execute software instructions by performing various input, logical, and/or mathematical operations. The processor 204 may have various computing architectures to method data signals (e.g., CISC, RISC, etc.). The processor 204 may be physical and/or virtual, and it may include a single core or plurality of processing units and/or cores. In some implementations, the processor 204 may be coupled to the memory 206 via the bus 210 to access data and instructions therefrom and store data therein. The bus 210 may couple the processor 204 to the other components of the computing system 200 including, for example, the memory 206, the communication unit 202, the input device 214, the output device 216, and the data storage device 208.

The memory 206 may store and provide access to data to the other components of the computing system 200. The memory 206 may be included in a single computing device or a plurality of computing devices. In some implementations, the memory 206 may store instructions and/or data that may be executed by the processor 204. For example, the memory 206 may store one or more of the web server 114, the tracking engine 108, and their respective components, depending on the configuration. The memory 206 is also capable of storing other instructions and data, including, for example, an operating system, hardware drivers, other software applications, databases, etc. The memory 206 may be coupled to the bus 210 for communication with the processor 204 and the other components of computing system 200.

The memory 206 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 204. In some implementations, the memory 206 may include one or more of volatile memory and non-volatile memory (e.g., RAM, ROM, hard disk, optical disk, etc.). It should be understood that the memory 206 may be a single device or may include multiple types of devices and configurations.

The bus 210 can include a communication bus for transferring data between components of a computing device 200 or between computing devices, a network bus system including the network 102 or portions thereof, a processor mesh, a combination thereof, etc. In some implementations, the tracking engine 108, web server 114, tracking engine 108, and various other components operating on the computing system/device 100 (operating systems, device drivers, etc.) may cooperate and communicate via a communication mechanism included in or implemented in association with the bus 210. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 202 may include one or more interface devices (I/F) for wired and wireless connectivity among the components of the system 100. For instance, the communication unit 202 may include, but is not limited to, various types known connectivity and interface options. The communication unit 202 may be coupled to the other components of the computing system 200 via the bus 210. The communication unit 202 can provide other connections to the network 102 and to other entities of the system 100 using various standard communication protocols.

The input device 214 may include any device for inputting information into the computing system 200. In some implementations, the input device 214 may include one or more peripheral devices. For example, the input device 214 may include a keyboard, a pointing device, microphone, an image/video capture device (e.g., camera), a touch-screen display integrated with the output device 216, etc. The output device 216 may be any device capable of outputting information from the computing system 200. The output device 216 may include one or more of a display (LCD, OLED, etc.), a virtual or augmented reality device, a printer, a haptic device, audio reproduction device, touch-screen display, a remote computing device, etc. In some implementations, the output device is a display which may display electronic images and data output by a processor of the computing system 200 for presentation to a user, such as the processor 204 or another dedicated processor.

In some implementations, the communication unit 202 or input device 214 may include various radios or receivers that may be used to receive information, for example, for locating the device 200 (e.g., a client system 106). In some instances, a cellular, Wi-Fi™, or Bluetooth™ radio may be used to determine a location of a client system 106. In some instances, the input device 214 may additionally or alternatively include a GPS sensor for receiving GPS signals and determining a geographic location of the device.

The data storage device 208 may include one or more information sources for storing and providing access to data. In some implementations, the data storage device 208 may store data associated with a database management system (DBMS) operable on the computing system 200. For example, the DBMS could include a structured query language (SQL) DBMS, a NoSQL DBMS, various combinations thereof, etc. In some instances, the DBMS may store data in multi-dimensional tables comprised of rows and columns, and manipulate, e.g., insert, query, update and/or delete, rows of data using programmatic operations.

The data stored by the data storage device 208 may be organized and queried using various criteria including any type of data stored by them, such as described herein. For example, the data storage device 208 may store the database 128. The data storage device 208 may include data tables, databases, or other organized collections of data. Examples of the types of data stored by the data storage device 208 may include, but are not limited to, the data described with respect to the figures, for example.

The data storage device 208 may be included in the computing system 200 or in another computing system and/or storage system distinct from but coupled to or accessible by the computing system 200. The data storage device 208 can include one or more non-transitory computer-readable mediums for storing the data. In some implementations, the data storage device 208 may be incorporated with the memory 206 or may be distinct therefrom.

The components of the computing system 200 may be communicatively coupled by the bus 210 and/or the processor 204 to one another and/or the other components of the computing system 200. In some implementations, the components may include computer logic (e.g., software logic, hardware logic, etc.) executable by the processor 204 to provide their acts and/or functionality. In any of the foregoing implementations, the components may be adapted for cooperation and communication with the processor 204 and the other components of the computing system 200.

Figure 3:
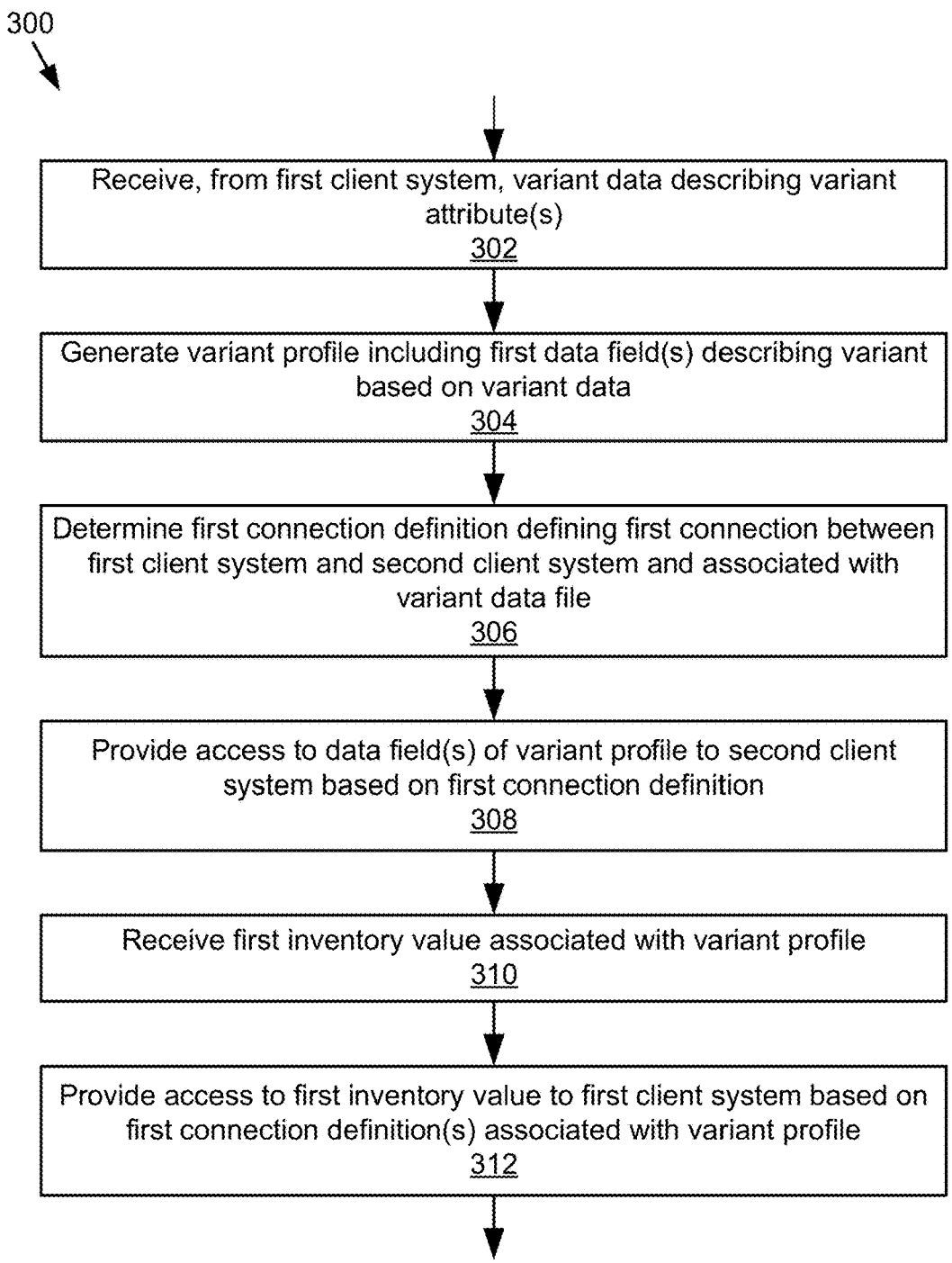
FIG. 3 is a flowchart of an example method for providing intelligent inventory tracking across supply-chain networks.

FIG. 3 is a flowchart of an example method 300 for providing intelligent inventory tracking across supply-chain networks. The method 300 provides example operations for providing features described herein, although other implementations are possible and contemplated herein.

In some implementations, at 302, the tracking engine 108 may receive, from a first client system 106, variant data describing a variant, which may represent a physical item, as described above. The received data may be organized into a product or variant profile and may include, for example, identification numbers, names, attributes, images, descriptions, etc. In some instances, as new data is received, the variant data file/profile/document may be automatically updated across systems. The variant data and other associated received or determined data may be organized into various attributes, fields, values, files, tables, databases, etc., as described elsewhere herein.

For example, a brand may input a value into a data field via a graphical interface or upload data (e.g., in a structured data file) via an application programming interface into the tracking engine 108, which may be stored in the catalog data 132b, for example, in a variant profile. For instance, a user associated with a brand may input master information describing a size, color, or other data for a variant, which may be, for example, a specific color and size of t-shirt, model of printer, or variation of another product. The user may mark the information/value as a master value that is used to track or identify the variant across nodes of a supply chain/network, or the tracking engine 108 may automatically use information provided by certain entities, nodes, client systems 106, or users, etc., as master information for tracking or description of the variant. For example, as described below, this information may be provided downstream or otherwise to other entities using the tracking engine 108. Accordingly, consistent information may be used across a supply chain/network and controlled by a certain entity (e.g., a brand) thereby ensuring accurate information is used downstream and a variant is consistently tracked.

For example, when data is entered separately into separate client system 106, which may include separate inventory tracking systems, the inventory may be incorrectly aggregated due to errors introduced in the separate inputs, differently described information, or otherwise. Accordingly, the tracking engine 108 uses the master information to consistently track data across nodes. As described elsewhere herein, separate or additional data fields and values may also be stored and/or associated with each entity or node in the supply chain/network without changing the master information. It should be noted that while data is described herein as being input for a single variant and data field, it may be provided in batches, tables, etc.

The received data may be used internally by various nodes/client systems 106, for example, for tracking and identifying inventory. Additionally, the master information may be directly published to web pages, digital catalogs, web-connected product tags/labels, or other digital information sources, for example, for consumption by customers of the client system 106 publishing the data. For instance, a brand may provide a description, which is transmitted or otherwise accessed by a retailer (e.g., their client system 106) via the tracking engine 108. The retailer may automatically publish a web page using the provided description, which ensures that the correct description is used and saving retailer time.

In some implementations, the received data may be updated at a later point. For instance, the tracking engine 108 may receive an update to the received data field and its value from a client system 106 (e.g., associated with a brand) and automatically push the new information (e.g., by transmitting data, allowing access to a data file, or otherwise), to downstream nodes, so that the updated data is automatically used in the downstream nodes, published to downstream web pages, or otherwise.

In some implementations, at 304, the tracking engine 108 may generate a variant profile or file based on the variant data. The variant profile may be any document or file that describes the variant, as described elsewhere herein. For instance, the variant profile may include a plurality of data fields and associated values, which may be shared, transmitted, or accessed by various client systems 106/nodes in a supply chain. For example, the variant profile may include master information provided by an upstream client system 106 or entity, data fields for receiving inventory, sales data, or other data from downstream client systems 106 or entities, and other information. As described elsewhere herein, the variant profile may be used to track and/or identify a variant across client systems 106 in a supply chain/network. Data access to the variant profile, individual data fields, or attributes/values in the data fields, etc., may be provided or restricted by the tracking engine 108, for example, as defined by an administrator, a connection, and/or an entity/client system 106 inputting the data.

In some implementations, at 306, the tracking engine 108 may determine one or more first connection definitions defining one or more first connections between the first client system 106 and a second client system 106. In some instances, the first connection may be associated with the variant profile or one or more of its data fields, so that information is automatically transferred across systems using the variant profile, as described elsewhere herein.

In some implementations, the connection definition may define a specific entity or node with which the data is shared, such as a retailer's client system 106 specifically sharing data with a client system 106 of a specific distributor. In some implementations, the connection definition may define a directionality of data flow, such as where data can be shared upstream to nodes directly in the supply chain. In some implementations, the connection definition may define which users, rolls, entity types (e.g., brands but not distributors), or other data-sharing restrictions or positive transmission instructions. For example, a separate connection may be established for each data field, for each direction, for an entire variant profile, for a catalog, or at any other level, so that one or multiple connections may be used by the tracking engine 108 to provide the data access described herein.

For example, in some implementations, a connection definition may define an association between client systems 106 specific to a catalog, variant, data field, that allows the tracking engine 108 to control data flow and access. In some instances, the connection definition causes communication of a file including the variant profile or portions thereof.

While the connection may be facilitated by metadata associated with the variant profile or data field, or another mechanism for providing data access, in some implementations, the connection may be a connection between computing systems, and the connection definition may represent application programming interfaces, protocols, credentials, public/private encryption keys, or otherwise. The connection definition may define whether data is transferred downstream, horizontally, or upstream for a given data field.

In some implementations, at 308, the tracking engine 108 may provide access to the variant profile or a portion thereof (e.g., one or more data fields or values thereof) to the second client system 106 based on the one or more first connection definitions. For instance, if the variant profile is generated by or for a brand, the profile/file or its fields and attributes may be transferred, transmitted, copied, accessed, or otherwise provided to a downstream device, such as that of a distributor or retailer, as described elsewhere herein. In some implementations, this data access or transfer may include transmission or other data access to the attributes, descriptions, media, etc., provided by an upstream client system 106, as described above.

In some implementations, at 310, the tracking engine 108 may receive a first inventory value associated with the variant profile or data field thereof. For instance, the tracking engine 108 may determine an inventory of the item associated with the second client system 106, such as by receiving input from a user, or communicating with a point-of-sale device, inventory management system, etc., as described elsewhere herein. For instance, an inventory management system on or associated with a client system 106 may track inventory at a given location for a retailer, and the inventory management system may communicate the inventory value for a given variant upstream via the variant profile, common data file, automatic data transfer, or otherwise based on the connection definition(s).

For example, a variant profile may be accessible, visible, or integrated with the client system 106 of a retailer to track inventory for the retailer and/or a physical location of the retailer (e.g., a warehouse, brick-and-mortar store, etc.). For instance, the retailer may manually or automatically (e.g., based on point-of-sale data, communication with inventory-tracking software, etc.) enter an inventory value for the variant identified by a variant profile, which accurately identifies a variant across nodes in a supply chain/network.

Although only a single instance of inputting or receiving inventory data is illustrated in FIG. 3, it should be noted that multiple downstream entities, such as retailers and distributors, may use the variant profile (or separate instances thereof, separate access thereto, or separate data fields thereof) to enter inventory information for a variant. Accordingly, via the connection(s) and based on the variant profile, multiple downstream nodes or client systems 106 may provide their own inventory data for aggregation by the tracking engine 108, display or processing by an upstream client system 106, or analysis, etc., by the inventory tracking server 112.

It should also be noted that although inventory values are expressly called out in this description, other data may also be input/retrieved/received by the tracking engine 108 in association with the variant profile, such as average sales price, notes, discounts, inventory location, or other data.

Depending on the implementation, the inventory value or other data may be associated with metadata or other data fields, etc., identifying a location of the inventory or storage location, a time stamp indicating when the inventory value was recorded, an identifier of the entity/node/client system 106/user that input the inventory value, or other data associated with the inventory value. The tracking engine 108 may transfer this data and/or use it to generate analytics respective to geographical regions, entities/nodes in the supply chain, or other analytics.

In some implementations, at 312, the tracking engine 108 may provide access to the first inventory value to the first client system 106 based on the one or more first connection definitions associated with the variant data file. For instance, when a connection between the first client system 106 and the second client system 106 exists for a variant profile (e.g., using an entity-level, brand-level, product-level, or variant-level connection), inventory data from the second client system 106 may be transferred, transmitted, copied, accessed, or otherwise provided upstream, for example, to the first client system 106.

Although not illustrated in FIG. 3, additional or different operations are possible and contemplated. For instance, the identification of connection and transferring inventory data described above may be performed over several additional nodes.

For example, the tracking engine 108 may determine a second connection definition defining a second connection (e.g., associated with the variant data file) between the second client system 106 and a third client system 106. The tracking engine 108 may provide the variant data file to the third client system 106 based on the second connection definition. The tracking engine 108 may receive a second inventory value associated with the variant data file, for example, from the third client system 106, which the tracking engine 108 may provide to the first client system 106 (e.g., based on the first connection definition and the second connection definition associated with the variant data file).

Using the operations described in reference to FIG. 3, data can be selectively and intelligently shared between various nodes, whether upstream, downstream, or otherwise in a supply chain or network. The data may include inventory, variant attributes, or other data that the tracking engine 108 transmits, transfers, or otherwise provides access based on connections, etc. Accordingly, attributes of one or more variants can be transferred downstream in a supply network and, using the commonly defined attributes, inventory values and other data for the one or more variants can be transferred upstream in the supply network.

Figure 4A:
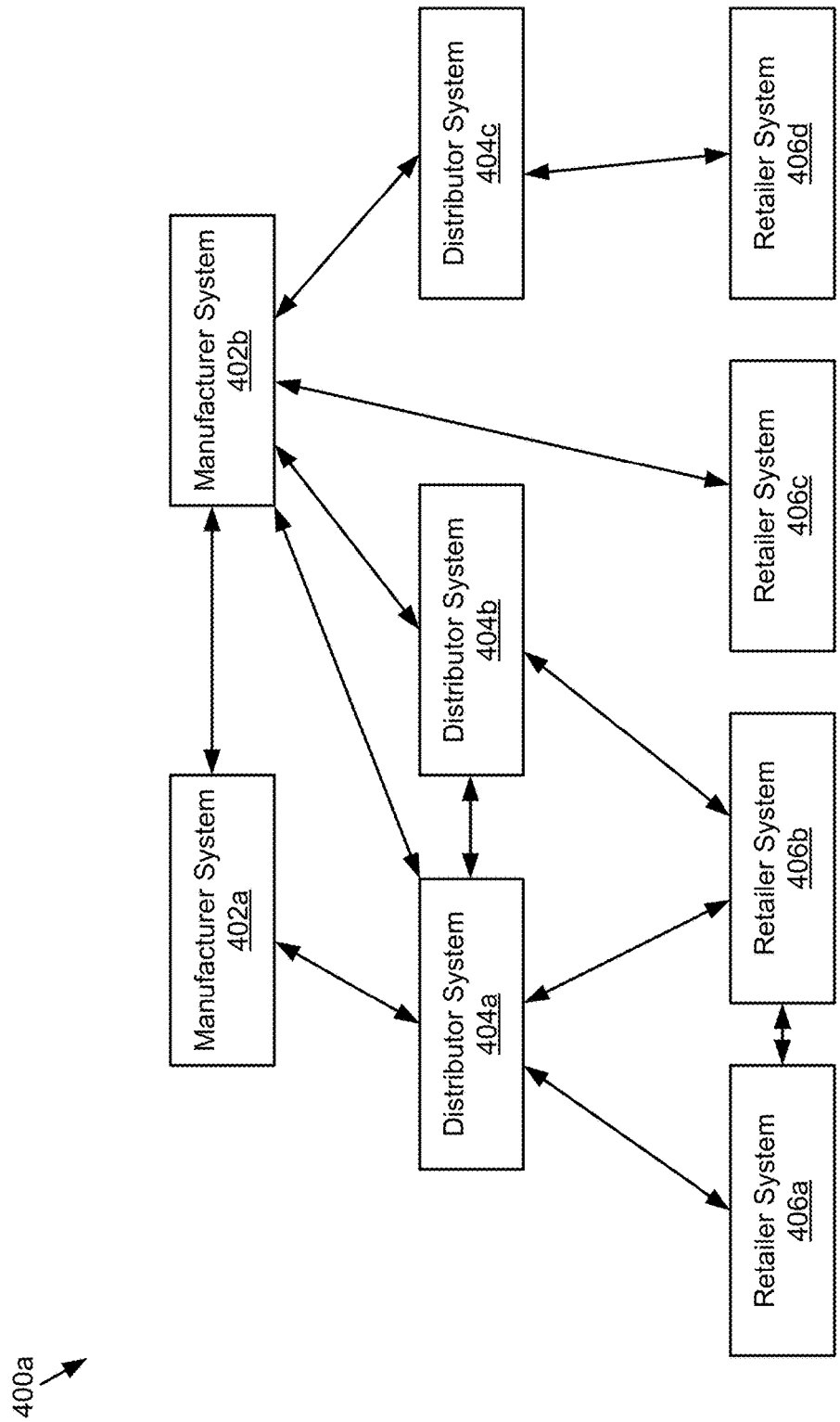
FIG. 4A illustrates a block diagram of an example supply chain network graph including connections between various nodes.

FIG. 4A illustrates a block diagram 400a of an example supply chain network graph including connections between various nodes. A connection may be unidirectional or bidirectional, although different information may flow in different directions and/or may only be provided to endpoints or certain nodes, depending on administrative settings. Although other implementations are possible, the example network graph or map illustrates manufacturer systems 402a and 402b (e.g., associated with a brand, warehouse, or manufacturer), distributor systems 404a, 404b, and 404c, and retailer systems 406a, 406b, 406c, and 406d, which may include separate computing devices, separate software instances, or separate divisions of the tracking engine 108.

For instance, one or more of the nodes 402, 404, and 406 may be, include, or be associated with a client system 106, as described above.

For example, as illustrated, a manufacturer system 402a may be coupled with a single distributor system 404a, which may be, in turn, connected to multiple retailer systems 406a and 406b. In another example, a manufacturer system 402b may be connected with multiple distributor systems 404 and/or retailer systems 406 (directly or indirectly). A distributor system 404 may be connected upstream to one or multiple manufacturer systems 402 and the connections may correspond to the brands/products/variants associated with the respective manufacturer. In some instances, a connection may be associated with each variant.

Further, as illustrated in the example block diagram 400a, a distributor system 404 may also be connected downstream with one or multiple retailers 406. Similarly, a retailer system 406 may be connected upstream with one or more distributor systems 404 and/or manufacturer systems 402, so that information associated with appropriate variants may be transferred.

In some implementations, other connections are possible and contemplated. For instance, entities at the same level or otherwise connected may exchange information using the connections, for example, retailer systems 406 may be connected to each other, distributor systems 404 may be connected to each other, or manufacturer systems 402, etc., may be connected. As illustrated in the example of FIG. 4A, manufacturer systems 402a and 402b may be connected via the connections described herein. Similarly, distributor systems 404a and 404b are shown connected, as are retailer systems 406a and 406b.

For example, the retailer systems 406a and 406b may receive physical products via separate distributors but may belong to the same company, owner, group, etc., so that they may share inventory, product, and/or catalog data using the tracking engine 108. Accordingly, using or based on the connection (whether directly or via the inventory tracking server 112), the respective retailer systems 406a and 406b may exchange product information or inventory information, as described elsewhere herein. Accordingly, for example, the retailer system 406a may access or receive inventory data of retailer system 406b and/or vice versa. If for example, two manufacturer systems 402 (or other entities) are connected using the tracking engine 108, the tracking engine 108 may automatically determine which entity (e.g., manufacturer) owns the product profile for purposes of defining the variant data/profile. For instance, the attributes in a file, document, or profile may be automatically associated with a certain manufacturer based on an administrative setting, based on an entity initiating a connection, etc. It should also be noted that information, whether product, catalog, or inventory, may flow in any direction via the connections, depending on the implementation.

As described in further detail above, data describing variants may flow downstream via/based on the connections while inventory information associated with the variants downstream may flow upstream via/based on the same connections. Accordingly, downstream nodes receive high-quality and up-to-date data while upstream nodes receive inventory, sales, shipping, pricing, and/or other data, depending on the implementation.

In some implementations, an entity may connect with data sets of a supply chain or network to access anonymized trend information or other analytics, which may be filtered or analyzed based on category or other variant attributes, for example, as described elsewhere herein.

The connections, transfer of data, etc., may be performed directly between the systems (e.g., a first node's system running a first instance of the tracking engine 108 or portion thereof may transmit data to a second node's system running a second instance of the tracking engine 108 or portion thereof), via the inventory tracking server 112 (e.g., with each system providing data to the inventory tracking server 112, which filters and/or relays data), or entirely on the inventory traffic server 112 (e.g., a connection may be an instruction or permission to transfer, point to, or display data in a subdivision of the database 128 associated with one or more of the entities). In some instances, the one or more of the systems 402, 404, and 406 may be connected to the inventory tracking server 112 via APIs or other means, which allow the systems to communicate with the server and/or each other. Additionally, or alternatively, files may be manually or automatically uploaded and downloaded between systems. For instance, although the connection and/or exchange of information is described as using APIs, it may additionally or alternatively be via transfer of flat files (e.g., CSV—Comma-Separated Values), EDI (Electronic Data Interchange) and/or via various transfer protocols, such as SMTP (Simple Mail Transfer Protocol), FTP (File Transfer Protocol), and AS2 (Applicability Statement 2), although other implementations are possible and contemplated herein.

In some instances, the tracking engine 108 may receive/transmit inventory, variant data, or other information automatically (e.g., via APIs) from/to other systems, such as point-of-sale systems, client relationship management systems, e-commerce servers, inventory management systems, order management systems, warehouse management systems, or other systems to transfer variant, catalog, inventory, or other data, as described herein.

As an example, a manufacturer system 402 may input a set of attributes describing a variant, which the tracking engine 108 provides to the distributor systems 404a, 404b, and 404c. The set of attributes may be provided to one or more of the retailer systems 406a, 406b, 406c, and/or 406d either directly or via one or more of the distributor systems 404a, 404b, and/or 404c. Based on the variant identified using the set of attributes, one or more of the retailer systems 406 or distributor systems 404 may input inventory values and/or other data for the identified variant. For example, a retailer system 406d may input an inventory value for the variant, which the tracking engine 108 provides upstream to the distributor system 404c, which, in turn, may provide the inventory value to the manufacturing system 402. In some implementations, the inventory value from the retailer system 406d may be visible to one or both of the distributor system 404c and manufacturer system 402b. In some instances, the tracking engine 108 may also use the inventory value to generate analytics, as described above.

The connections between nodes may form a network inventory, which may be stored in a data structure, such as a graph. In some implementations, a graphical inventory network graph may be generated and displayed by a tracking engine 108, although, in other implementations, it may be a data construct indicating interconnected nodes of a supply chain or network, as described above. For instance, an inventory graph may be provided in an adjustable format or report (e.g., in a network cloud, tree, or tabular format), which display graphical visualizations the network of connections. Various analytics, data access controls, and filtering may be performed using the inventory graph, as described herein.

In some implementations, as noted above, the inventory networking (e.g., provided by the tracking engine 108 and associated connections) provides inventory values at various points in the network, which may be manually or automatically filtered, parsed, or processed to show meaningful data or analytics. For instance, each inventory value may be associated with a certain system, node, or geographic location. In response to a manual or automatic trigger (e.g., a user input requesting to see inventory in a geographic region), the tracking engine 108 may aggregate inventory in a certain geographic region. The tracking engine 108 may determine which nodes or inventory values are associated with geographic locations in that geographic region and present the sums or other information to the requesting user or system. Accordingly, intelligent reports may be automatically generated that provide insights into the types of nodes (e.g., distributors, retailers, etc.) with inventory, the geographic locations where inventory exists, doesn't exist, or has a fast/slow inventory change, or other data. Similarly, the inventory networking may use the connections across the system to identify and surface data across businesses or parties, thereby indicating insufficient or surplus inventory or other data, such as suggested connections. The data may be automatically filtered, modified, or processed depending on a user accessing the data (e.g., an upstream manager may have more or different data access than a downstream sales representative) or a system/node accessing the data, as noted above.

Figure 4B:
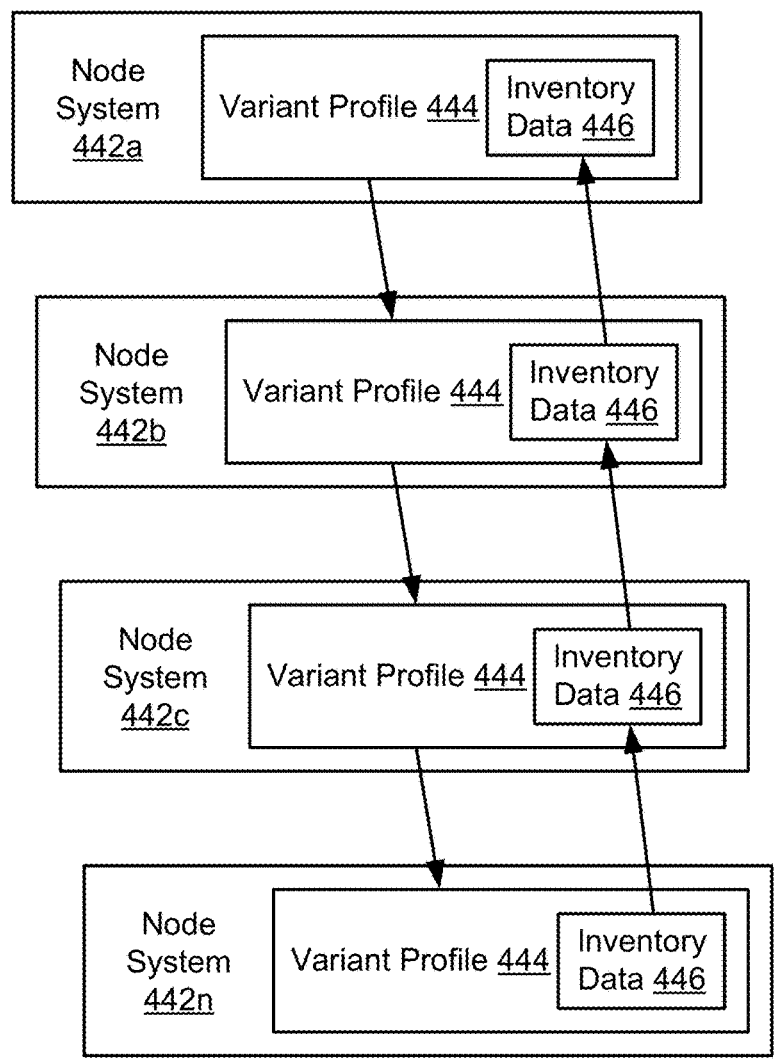
FIG. 4B illustrates a block diagram showing an example flow of data among connected nodes of a supply network.

In some implementations, the tracking engine 108 may also provide product networking, which directs or indicates the interchange of various product data (e.g., variant profiles, etc.) among various nodes of the network. The product networking may be associated and interconnected with the inventory networking, for example, as illustrated in the example of FIG. 4B. The product networking allows product data/profiles/documents to be transmitted or accessed by various nodes of the network.

In some implementations, the product networking structure may be stored or represented in a product graph, which may be a graphical report and/or data construct that indicates sharing of product data, for example, using the connections between nodes, similar to the inventory graph. The product graph may be graphically represented or stored in a network, such as a node cloud, tree, or table, for example. In some implementations, the tracking engine 108 may use the product graph to network product data, for example, to determine which nodes have access to which product data/documents/profiles, which entities are allowed to modify the data, how the data is updated or modified, and/or associations of the data with certain nodes, locations, inventory data, or other data.

FIG. 4B illustrates a block diagram 400b showing an example flow of data among connected nodes (e.g., which may represent a system 402, 404, 406, or 106) of a supply network. For instance, each node is represented by a node system 442a . . . 442n, which may be separate computing devices, client systems 106, or divisions (e.g., of the tracking engine 108 on the inventory tracking server 112) accessible to separate entities. The connections, data transfer, or access between the systems 442 may be direct or via the inventory tracking server 112, as described elsewhere herein. Additionally, the data (e.g., the variant profiles 444 and inventory data 446) may be stored on a centrally accessible data source (e.g., the inventory tracking server 112) via which access is provided to each node system 442 and/or, alternatively, the data may be stored on each node system 442 and updates may be transmitted to one or more other node systems 442

(e.g., directly, via another connected node system, or via the inventory tracking server 112).

As illustrated, a first node system 442a may have data describing a variant profile 444, which may be a document or file describing a variant or product, such as its attributes, images, identification code(s), etc., as described elsewhere herein. The variant profile 444 may be shared as part of a group or set of products/variants, for example, in a catalog, or may be separately shared, depending on the implementation. Similarly, some or all of the variant profile's 444 data fields may be shared or access restricted. Connections may be established between various node systems 442, for example, in an offer/acceptance scheme, as described above. As illustrated in FIG. 4B, node system 442a has a connection with node system 442b, which, in turn, has a second connection with node system 442c, which has a third connection with node system 442n.

As illustrated in the example, the variant profile 444 may be shared by the node system 442a with the node system 442b, which then has access to the variant profile along with the description, media, etc., of a variant. Accordingly, the variant profile 444 used by the node system 442b may include the data defined by the node system 442a thereby ensuring that both entities have access to the same information, which may be defined by a single entity (e.g., the node system 442a sharing the profile), although each entity may additionally or alternatively have stored additional data associated with a variant that is not shared (e.g., private data, such as comments, prices, etc.).

In some implementations, when the variant profile is updated, for example, at the node system 442a, the update may flow downstream to other node systems 442b ... 442n, so that each entity has up-to-date product information.

In some implementations, inventory data 446 may be shared via the connections established by or otherwise associated with the variant profile 444. For instance, a node system 442b may post an inventory level to inventory data 446 of a variant profile 444, which inventory level/values may flow upstream (e.g., directly or via the inventory tracking server 112) to one or more entities (e.g., node systems 442). Accordingly, by virtue of a downstream node system 442n having access to the variant profile (e.g., which flows downstream), the inventory data of the node system 442n may be transferred/accessed upstream (e.g., inventory data at the node system 442n may be accessed by a node system 442a, 442b, or 442c).

For example, a variant profile 444 may be shared by a node system 442a with a node system 442b, which may, in turn, share the variant profile 444 with the node system 442c, which may, in turn, share the variant profile with the node system 442n. While node systems 442a and 442n may not be connected directly (although they may be connected in other implementations), the variant profile 444, or some of its data fields/values, may be shared, transmitted, accessed, and/or updated via the interim connections. Additionally, the inventory data 446 from each respective node (e.g., inventory values associated with a respective node system 442) may be shared with some or all of the node systems 442 that have access to the variant profile 444 (e.g., those nodes that are upstream in the chain). For example, the node system 442n may update its inventory value, which the tracking engine 108 associates with the node system 442n and shares with one or more of the other node systems 442a-442c. Accordingly, inventory data for/from the node system(s) 442n, 442c, 442b, and/or 442a may each be shared with one or more other node systems 442 (e.g., those that are upstream, although other implementations are possible and contemplated herein). Thus, the node system 442a, which provides the variant profile 444 may receive inventory data 446 from the entities which have access to the variant profile. Similarly, if a node system 442 does not have access to the variant profile 444, it also does not share inventory data for that variant.

In some implementations, the tracking engine 108 may control the direction of data flow and/or the number of connections or degrees of separation that data may be shared and/or the granularity of data at certain points or distances in the network.

In some implementations, the tracking engine 108 may use the variant profile and/or associated data fields to perform analytics. For example, the tracking engine 108 may aggregate inventory and other data corresponding to variants, data fields, attributes, categories, etc., using the connections. The tracking engine 108 may gather data describing inventory levels, locations, custom data fields, sales or sell-through data, or any of the other data fields/types described herein, for example. The data may be aggregated from a plurality of downstream nodes and/or physical locations using a variant profile to determine total inventory levels. Similarly, the data may indicate an identity of the nodes/client devices or other associated data to determine a region-specific inventory level for a geographic region using the gathered inventory values.

The data that is gathered by the tracking engine 108 may be aggregated and filtered into data tables or graphs, such as an inventory graph representing inventory for variant(s) among entities and locations, which the client device of the entity may feed into a consumer website, sales customer relationship manager, or other software.

The tracking engine 108 may allow the aggregated data to be filtered and/or analyzed based on inventory levels, sell-through rate, geographical location, entity association, timing, or otherwise. For instance, the tracking engine 108 may use data gathered from a supply chain network, as described above, to detect industry, supply chain, or more specific trends associated with variants, categories (e.g., described by attributes of variants), etc., thereby providing analytics to balance and improve the supply chain network.

In some implementations, the tracking engine 108 may anonymize and/or combine data and/or analytics with data from other nodes or networks to determine categorical trends, provide downstream inventory forecasting, or other analytics. For instance, the tracking engine 108 may use the movement of inventory across a supply chain based on these technologies to perform real-time, accurate forecasting using up-to-date and accurate information, which was not previously possible, as noted above.

Figure 5A:
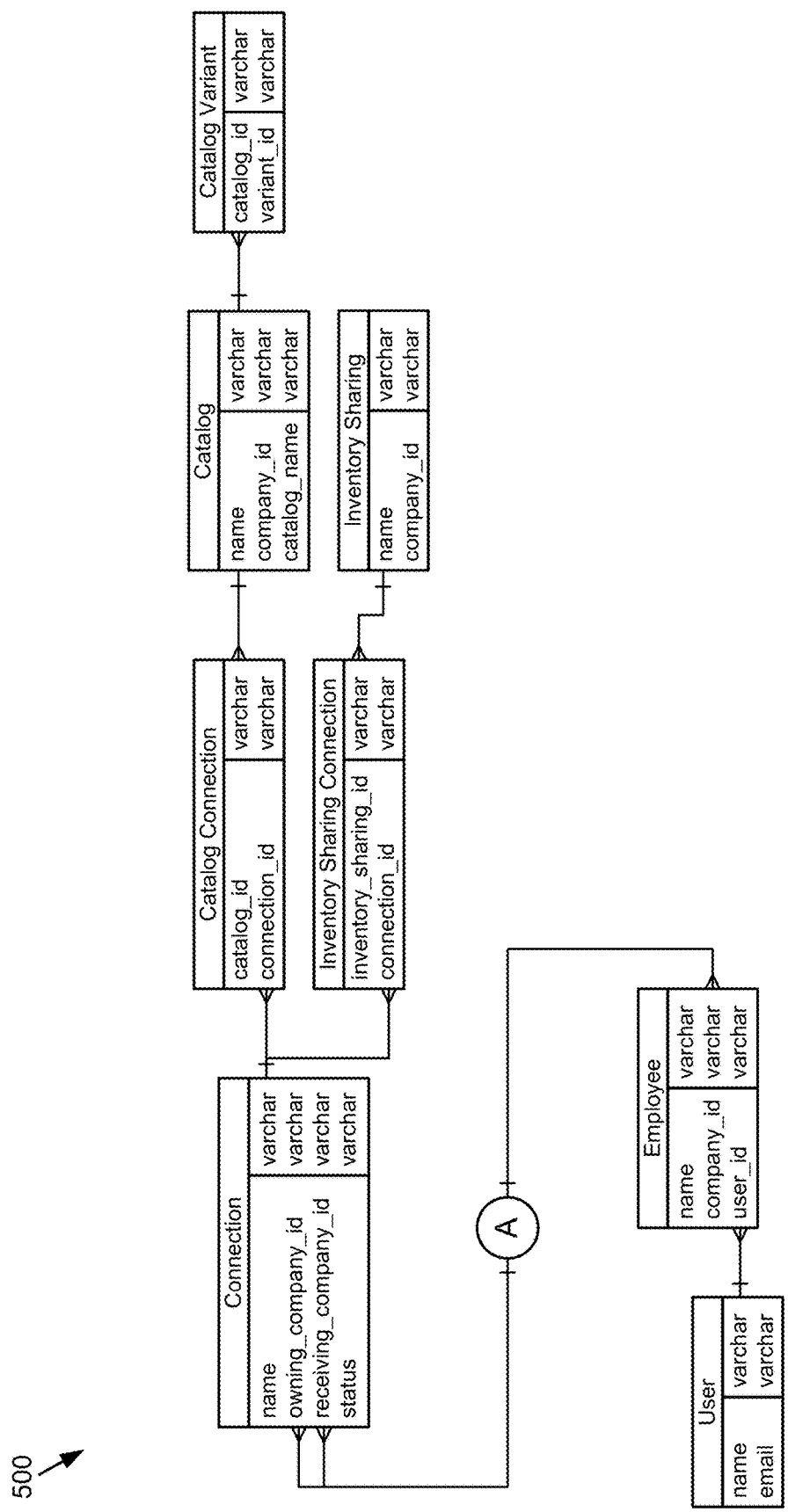
FIGS. 5A and 5B illustrate an example database structure diagram.
Figure 5B:
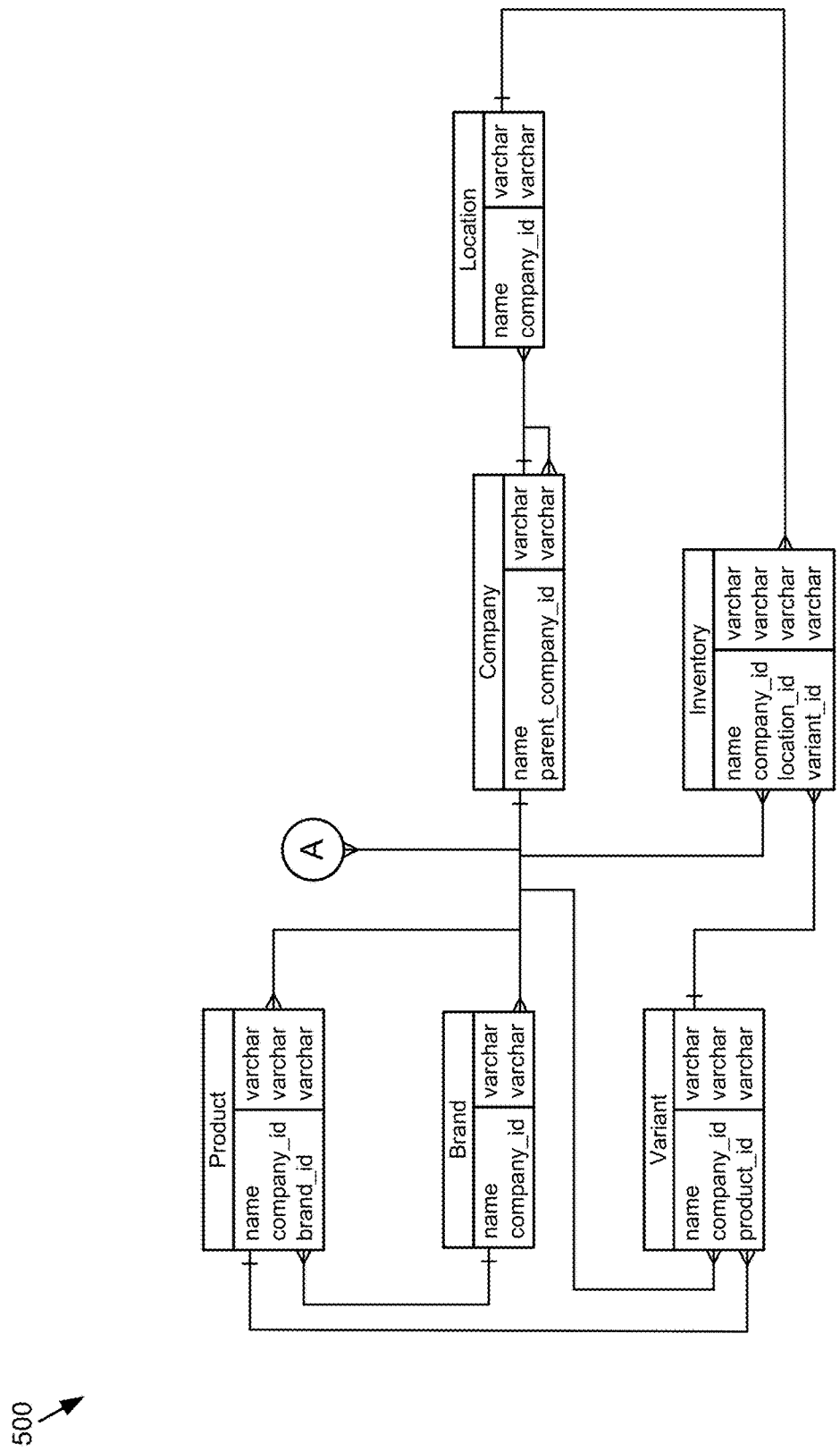

FIGS. 5A and 5B illustrate an example database structure diagram 500 that illustrates fields, entity relationships, types, keys, attributes, etc. For example, the example diagram 500 illustrates various data fields and their relationships to one another. It should be noted that although certain example cardinality and ordinality are illustrated in diagram 500, other implementations are possible and contemplated herein. Accordingly, the tracking engine 108 may use the example data structure and relationships reflected in the example diagram 500 to track data and provide functionality, as described above.

Figure 6A:
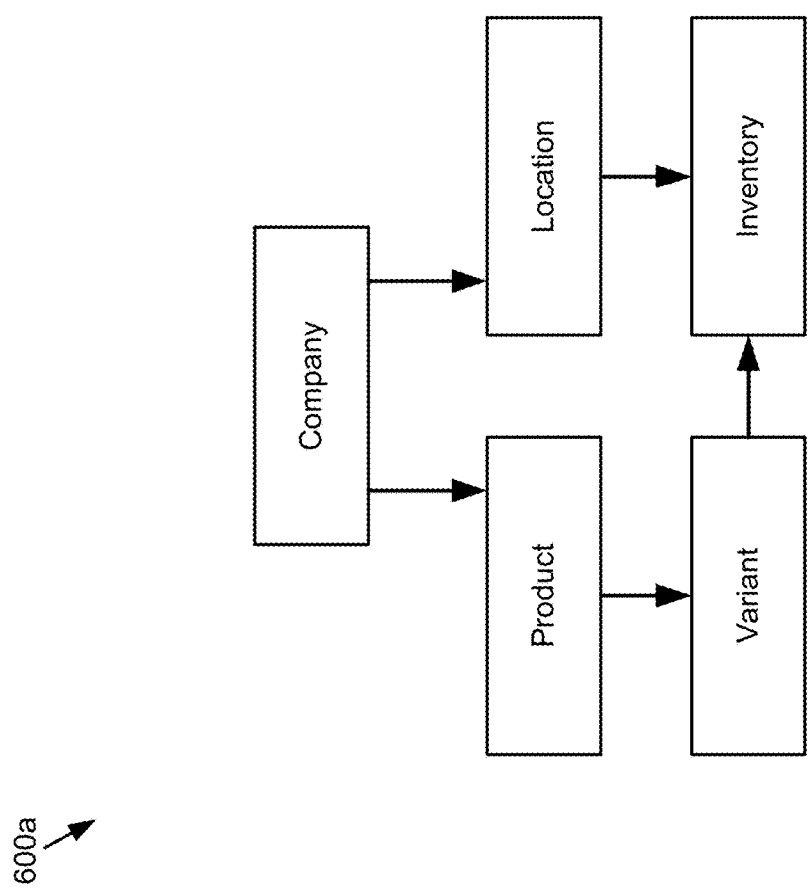
FIG. 6A is a block diagram illustrating an example data structure associated with a given node or entity.

FIG. 6A is a block diagram 600a illustrating an example data structure associated with a given node or entity. For instance, a company may have data associated thereto describing a catalog of products and the products' variants, which are associated with the company's inventory of those items. Additionally, the data may describe a particular geographic location or area, which may be associated with a company and/or inventory (e.g., so inventory levels in a particular geographic region may be determined).

Figure 6B:
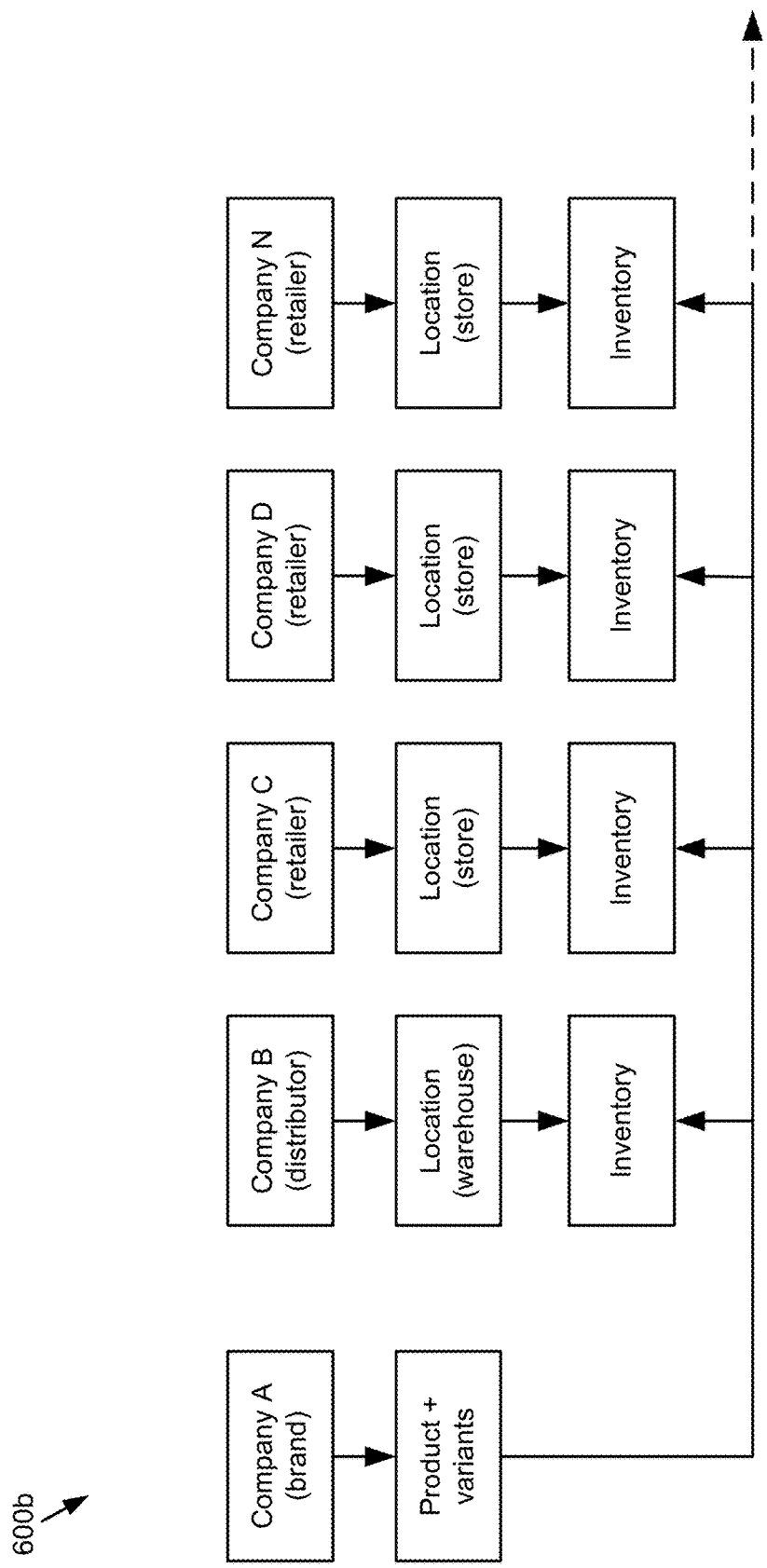
FIG. 6B is a block diagram showing relationships between data stored for various entities or nodes.

FIG. 6B is a block diagram 600b showing relationships between data stored for various entities or nodes, such as a brand and its product with various other companies (e.g., distributors, retailers, etc.), which may be maintained and/or provided using the tracking engine 108. As depicted in the example, the company A may own the product/variant data, while the connected companies B . . . N own the inventory data. The connected relationship(s) allow the product/variant data to be shared downstream while the inventory data may be shared upstream. As illustrated, the brand may receive data (and provide data to/for) any number of downstream entities. In some implementations, as described above, the tracking engine 108 may filter and/or analyze the data to improve its usefulness to various entities.

Figure 7A:
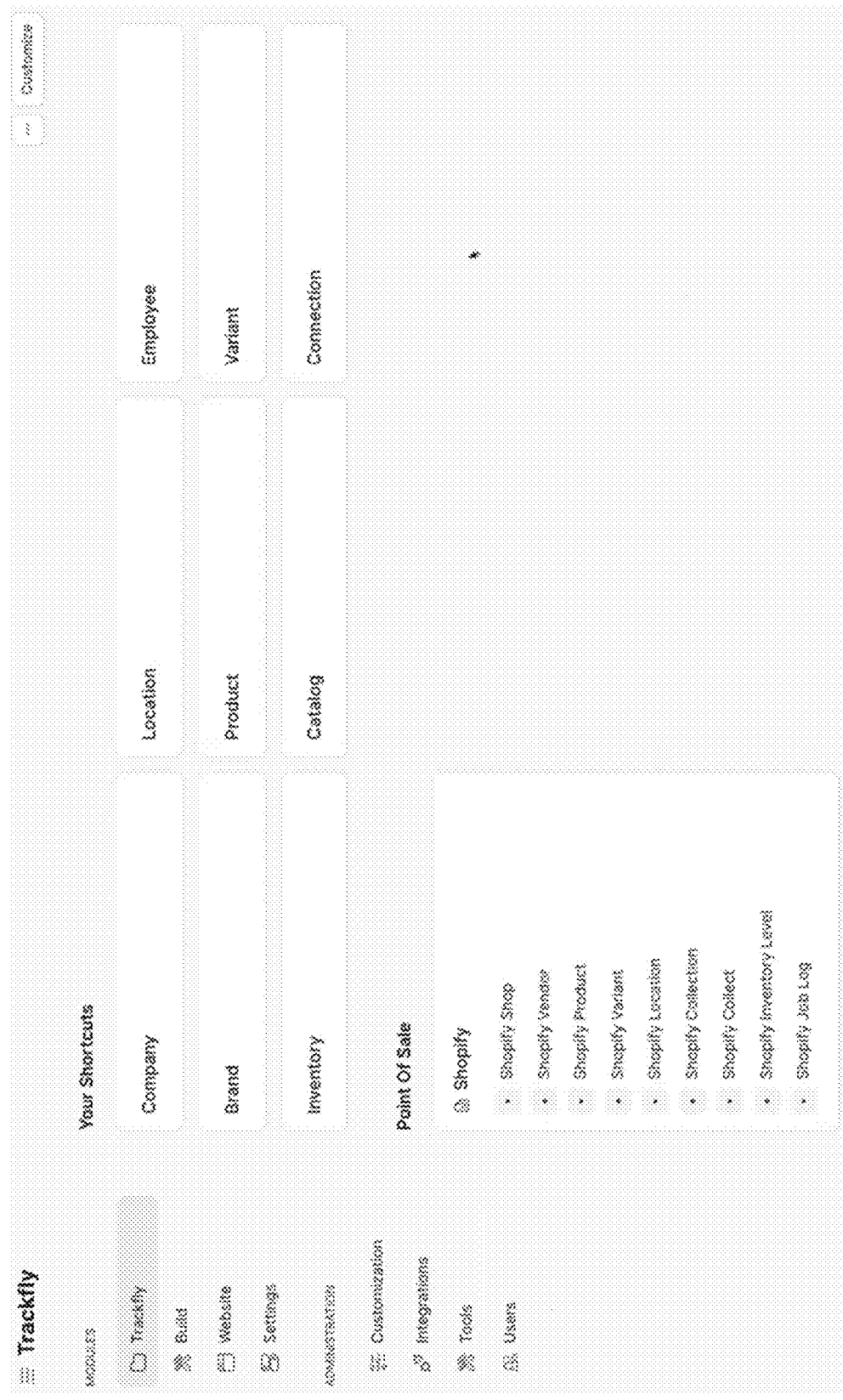
FIG. 7A is an example graphical user interface for interacting with a tracking engine.

FIG. 7A is an example graphical user interface 700a, which may be displayed by or in association with the tracking engine 108 (e.g., via a web server, local application, browser, etc.). As illustrated, the interface may include various graphical elements representing buttons or shortcuts that may be selected. For instance, using a company shortcut, the interface 700a may display companies associated with a user signed into the system. Using a location shortcut, the interface 700a may display locations of companies and/or inventory. Using an employee shortcut, the interface 700a may display employees associated with one or more company(ies) and/or their permissions, etc. Similarly, using brand, product, or variant shortcuts, the interface 700a may display and/or allow modification of documents or profiles (e.g., attributes, names, ID numbers, images, etc.) describing brands, products, and/or variants. Using an inventory shortcut, the interface 700a may display inventory information for one or more nodes and/or locations and/or allow modification of inventory. Using a catalog shortcut, the interface 700a may display and/or allow association of various brands, products, variants, etc., with a certain entity/node to build or show a catalog. Using a connection shortcut, the interface 700a may display and allow establishment and/or management of connections/connection definitions to different entities/nodes for example, for certain brands, products, variants, etc.

In some implementations, the tracking engine may display various interfaces based on selection of the inventory graphical element. For instance, a chart or table may be displayed with data columns indicating variant names, entity having the inventory, inventory level, date, comments, or other data. The fields, rows, columns, etc., may be sorted based on entity, location, variant name, etc. In some implementations, pop ups, overlays, or other interfaces may be displayed upon selection of a value in the table, which may indicate, for instance, an inventory history (e.g., as a table or graph) or other data associated with the value.

Figure 7B:
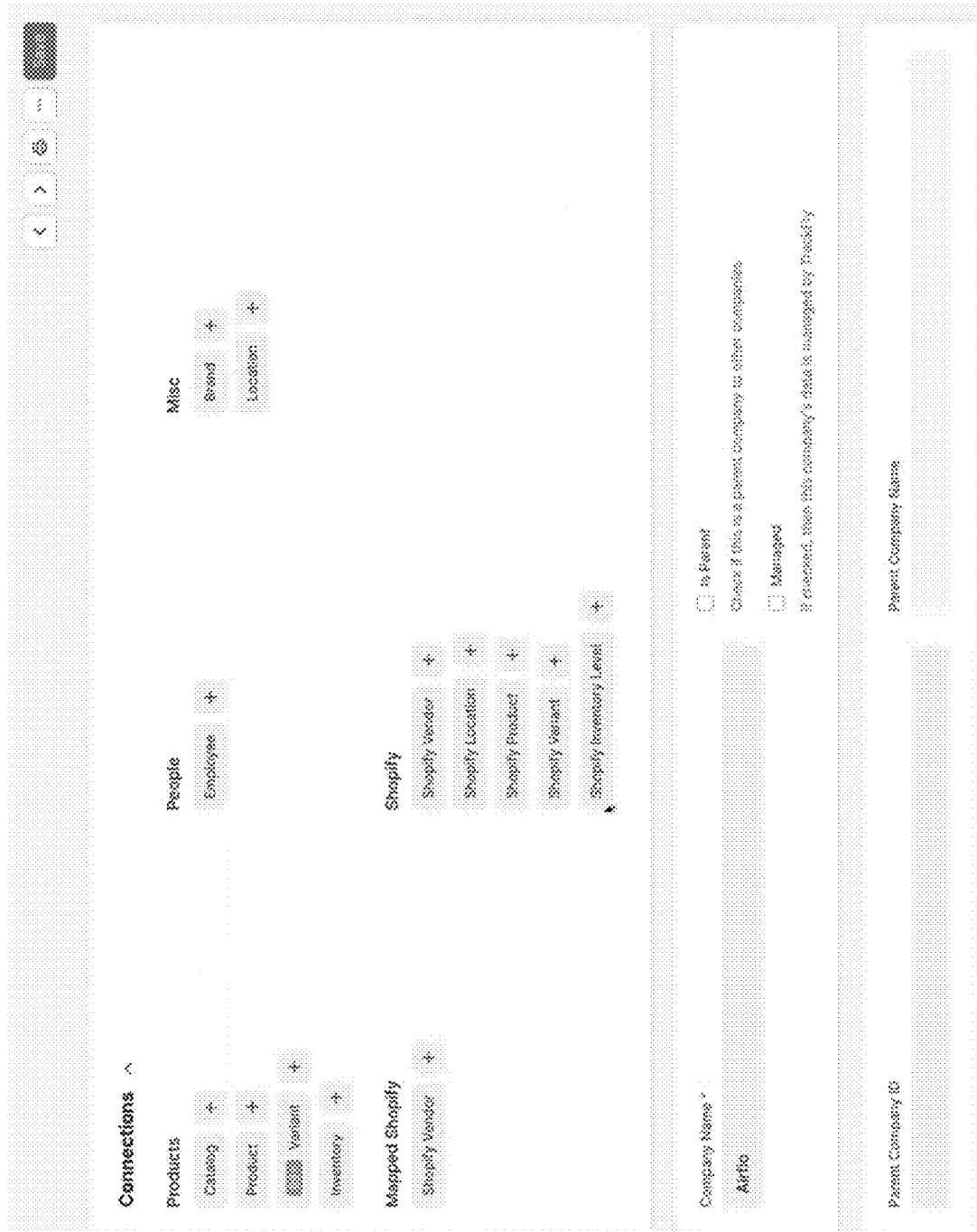
FIG. 7B is an example graphical interface for defining connections.

FIG. 7B is an example graphical interface 700b, for example, which may be displayed by or in association with the tracking engine 108 based on selection of the connections graphical element in FIG. 7A.

Figure 7C:
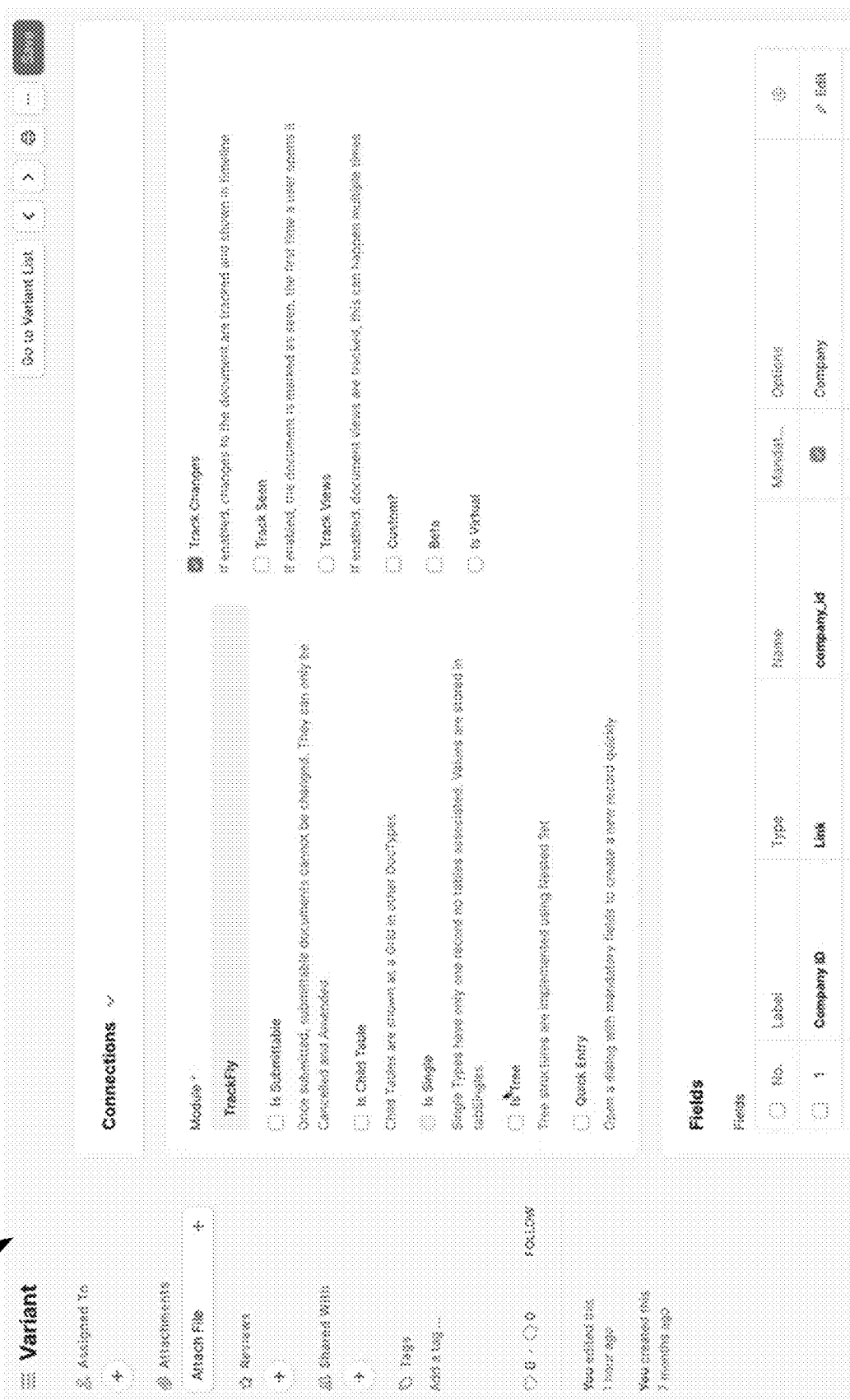

FIG. 7C is an example graphical interface 700c, for example, which may be displayed by or in association with the tracking engine 108 based on selections of the variants shortcut graphical element described above. The interface 700c may allow definition of various attributes, data, fields, and/or filters of data that may be used for a variant. For instance, the interface 700d may show or allow definition of fields or their values for each variant, such as brand name, product name, variant name, image, properties, identifiers, etc. As illustrated, data about connections, such as products, catalog(s), variants, inventory, company information, etc., may be displayed and or defined using the interface. For instance, a variant profile may include attachments, assignment/ownership information, sharing/connection definitions, tags, completion tags, parent/child relationships (e.g., where a variant is related to a product/other variants), viewable information, and other information.

In some implementations, custom data field may be created, for example, by a brand, which allows the brand to track, across their supply chain, unique, custom data points for the products they manufacture. Accordingly, the tracking engine 108 may allow new data fields to be generated and access thereto propagated among other nodes in the supply chain/network in the same way as other data fields described above. Accordingly, downstream nodes may supply data values associated with the custom data field, there by allowing the data to be effectively gathered whether it is inventory values or other data.

In some implementations, as data is entered into the interfaces and/or received by the tracking engine 108 (e.g., from other systems, as described above), the tracking engine 108 may convert data to a useable and consistent data structure. For example, FIG. 7D illustrates an example graphical user interface 700d, which may be part of or associated with the interface 700d. For instance, the example interface 700d illustrates example data fields, types, names, options, etc., which may be edited, filtered, or modified and which describe or form part of a variant profile. For instance, the interface 700d illustrates fields for a variant profile including company ID, product ID, company name, product name, brand name, variant name, status, primary image, variant properties/attributes, identifiers, MPNs (manufacturer part number), SKUs (stock keeping units), although other fields are possible and contemplated herein.

For instance, the tracking engine 108 may build out JSON files and, in turn, a database of information as it is received, so that the data may be used by the tracking engine 108 and/or translated for use by other systems.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system 100 and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer-readable medium can be any nontransitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
   determining, by one or more processors, a first connection between a first client system and a second client system for a variant profile, the variant profile describing a variant of a physical item;
   determining, by the one or more processors, a second connection between a third client system and the second client system for a second variant profile, the second variant profile describing a second variant of a second physical item;
   receiving, by the one or more processors, a first inventory value associated with the variant profile from the second client system;

receiving, by the one or more processors, a second inventory value associated with the second variant profile from the second client system;
providing, by the one or more processors, access to the first inventory value to the first client system based on the first connection associated with the variant profile; and
providing, by the one or more processors, access to the second inventory value to the third client system based on the second connection associated with the second variant profile.

2. The computer-implemented method of claim 1, further comprising:
receiving, by the one or more processors, an attribute for a first data field of the variant profile from the first client system, the attribute describing the variant; and
providing, by the one or more processors, access to the first data field and the attribute to the second client system based on the first connection.

3. The computer-implemented method of claim 2, further comprising:
determining, by the one or more processors, a third connection between the second client system and a fourth client system; and
providing, by the one or more processors, access to the first data field and the attribute by the fourth client system based on the third connection.

4. The computer-implemented method of claim 3, further comprising:
receiving, by the one or more processors, a third inventory value from the fourth client system; and
providing, by the one or more processors, access to the third inventory value by the first client system based on the first connection.

5. A computer-implemented method comprising:
receiving, by one or more processors, from a first client system, variant data describing a variant, the variant including a physical item, the variant data describing one or more attributes of the physical item;
generating, by the one or more processors, a variant profile based on the variant data, the variant profile including one or more data fields, a first data field of the one or more data fields describing an attribute of the variant;
determining, by the one or more processors, one or more first connection definitions defining one or more first connections between the first client system and a second client system, the one or more first connections being associated with the variant profile;
providing, by the one or more processors, access to the first data field to the second client system based on the one or more first connection definitions;
determining, by the one or more processors, one or more second connection definitions defining one or more second connections between a third client system and the second client system, the one or more second connections being associated with a second variant profile of a second variant, a second data field describing the second variant being received from the third client system;
providing, by the one or more processors, access to the second data field to the second client system based on the one or more second connection definitions;
receiving, by the one or more processors, a first inventory value associated with the variant profile and a second inventory value associated with the second variant profile from the second client system;
providing, by the one or more processors, access to the first inventory value to the first client system based on the one or more first connection definitions associated with the variant profile; and
providing, by the one or more processors, access to the second inventory value to the third client system based on the one or more second connection definitions associated with the second variant profile.

6. The computer-implemented method of claim 5, further comprising:
determining, by the one or more processors, one or more third connection definitions defining one or more third connections between the second client system and a fourth client system, the one or more third connections being associated with the variant profile;
providing, by the one or more processors, access to the first data field of the variant profile to the fourth client system based on the one or more third connections;
receiving, by the one or more processors, a third inventory value associated with the variant profile from the third fourth client system; and
providing, by the one or more processors, access to the second third inventory value to the first client system based on the one or more first connection definitions and the one or more third connections associated with the variant profile.

7. The computer-implemented method of claim 6, wherein the first client system is associated with a brand, the second client system is associated with a distributor, and the fourth client system is associated with a retailer, the second client system and the fourth client system each including an inventory management system.

8. The computer-implemented method of claim 6, further comprising:
receiving, by the one or more processors, a plurality of inventory values for a plurality of different variant profiles corresponding to a plurality of different variants, the plurality of different variant profiles including the first data field and the attribute described by the first data field; and
generating, by the one or more processors, an analytic describing the attribute for the plurality of different variant profiles using the first inventory value and the plurality of inventory values.

9. The computer-implemented method of claim 5, wherein:
the one or more first connection definitions define an association between the first client system and the second client system that causes the first data field to be transmitted to the second client system.

10. The computer-implemented method of claim 5, wherein:
the one or more first connection definitions describe data-field specific access for the variant profile based on an identity of a receiving client system, the receiving client system including the first client system, the data-field specific access controlling access to the first inventory value by the first client system.

11. The computer-implemented method of claim 10, further comprising:
transmitting, by the one or more processors, the first inventory value to the first client system based on the data-field specific access defined by the one or more first connection definitions.

12. The computer-implemented method of claim 5, further comprising:

receiving, by the one or more processors, a set of inventory values from a set of client systems, the set of inventory values identifying inventory for the variant at a set of physical locations; and determining, by the one or more processors, a total inventory level based on the set of inventory values and the first inventory value.

13. The computer-implemented method of claim 12, further comprising:

associating, by the one or more processors, data describing the first inventory value with the first inventory value, the data indicating an identity of the second client system from which the first inventory value was received; and determining a region-specific inventory level for a geographic region based on the set of inventory values, the first inventory value, and the data describing the first inventory value.

14. The computer-implemented method of claim 5, further comprising:

determining, by the one or more processors, a third connection definition defining a third connection between the first client system and the second client system, the third connection being associated with a third variant profile for a second third variant;

receiving, by the one or more processors, a third inventory value associated with the third variant profile from the second client system; and providing, by the one or more processors, access to the third inventory value to the first client system using the third connection.

15. The computer-implemented method of claim 14, further comprising:

determining, by the one or more processors, a fourth connection definition defining a fourth connection between the first client system and a fourth client system, the fourth connection being associated with the variant profile of the variant;

receiving, by the one or more processors, a fourth inventory value associated with the variant profile from the fourth client system; and providing, by the one or more processors, access to the fourth inventory value to the first client system based on the third connection.

16. A system comprising:

one or more processors; and a computer-readable memory storing instructions that, when executed by the one or more processors, cause the system to:

receive from a first client system, variant data describing a variant, the variant including a physical item, the variant data describing one or more attributes of the physical item;

generate a variant profile based on the variant data, the variant profile including one or more data fields, a first data field of the one or more data fields describing an attribute of the variant;

determine one or more first connection definitions defining one or more first connections between the first client system and a second client system, the one or more first connections being associated with the variant profile;

provide access to the first data field to the second client system based on the one or more first connection definitions;

determining, by the one or more processors, one or more second connection definitions defining one or more second connections between a third client system and the second client system, the one or more second connections being associated with a second variant profile of a second variant, a second data field describing the second variant being received from the third client system;

providing, by the one or more processors, access to the second data field to the second client system based on the one or more second connection definitions;

receive a first inventory value associated with the variant profile and a second inventory value associated with the second variant profile from the second client system;

provide access to the first inventory value to the first client system based on the one or more first connection definitions associated with the variant profile; and providing, by the one or more processors, access to the second inventory value to the third client system based on the one or more second connection definitions associated with the second variant profile.

17. The system of claim 16, wherein the instructions further cause the system to:

determine one or more third connection definitions defining one or more third connections between the third client system and a fourth client system, the one or more third connections being associated with the variant profile;

provide access to the first data field of the variant profile to the fourth client system based on the one or more third connection definitions;

receive a third inventory value associated with the variant profile from the fourth client system; and provide access to the third inventory value to the first client system based on the one or more first connection definitions and the one or more third connection definitions associated with the variant profile.

18. The system of claim 17, wherein the first client system is associated with a brand, the second client system is associated with a distributor, and the fourth client system is associated with a retailer, the second client system and the fourth client system each including an inventory management system.

19. The system of claim 17, wherein the instructions further cause the system to:

receive a plurality of inventory values for a plurality of different variant profiles corresponding to a plurality of different variants, the plurality of different variant profiles including the first data field and the attribute described by the first data field; and generate an analytic describing the attribute for the plurality of different variant profiles using the first inventory value and the plurality of inventory values.

20. The system of claim 16, wherein:

the one or more first connection definitions define an association between the first client system and the second client system that causes the first data field to be transmitted to the second client system.

* * * * *